(12) United States Patent (10) Patent No.: US 7,298,962 B2
Quan et al. (45) Date of Patent: Nov. 20, 2007

(54) METHOD AND APPARATUS FOR REDUCING AND RESTORING THE EFFECTIVENESS OF A COMMERCIAL SKIP SYSTEM

(75) Inventors: Ronald Quan, Cupertino, CA (US); John O Ryan, Woodside, CA (US); Peter Wonfor, El Granada, CA (US)

(73) Assignee: Macrovision Corporation, Santa Clara, CA (US)

( * ) Notice: Subject to any disclaimer, the term of this patent is extended or adjusted under 35 U.S.C. 154(b) by 1164 days.

(21) Appl. No.: 10/436,008

(22) Filed: May 12, 2003

(65) Prior Publication Data

US 2004/0228605 A1 Nov. 18, 2004

(51) Int. Cl.
*H04N 5/91* (2006.01)
(52) U.S. Cl. .......................................... 386/46; 725/32
(58) Field of Classification Search .................. 386/1, 386/46, 52, 68–70, 94, 95, 125; 358/553, 358/700, 731, 732, 738, 908; 725/18, 22, 725/32
See application file for complete search history.

(56) References Cited

U.S. PATENT DOCUMENTS

| | | | |
|---|---|---|---|
| 4,750,052 A | 6/1988 | Poppy et al. | |
| 5,333,091 A | 7/1994 | Iggulden et al. | |
| 5,668,917 A | 9/1997 | Lewine | |
| 5,692,093 A | 11/1997 | Iggulden et al. | |
| 5,696,866 A | 12/1997 | Iggulden et al. | |
| 5,911,029 A * | 6/1999 | Sakaguchi et al. | 386/46 |
| 6,002,831 A * | 12/1999 | Tada et al. | 386/46 |
| 6,480,667 B1 * | 11/2002 | O'Connor | 386/83 |

(Continued)

FOREIGN PATENT DOCUMENTS

| | | |
|---|---|---|
| EP | 0 735 754 | 10/1996 |
| WO | WO 98/20675 | 5/1998 |
| WO | WO 01/95628 | 12/2001 |

OTHER PUBLICATIONS

PCT Search Report for PCT/US2004/011409 dated May 12, 2005, 3 pages.

*Primary Examiner*—Thai Q. Tran
*Assistant Examiner*—Mishawn Dunn
(74) *Attorney, Agent, or Firm*—George B. Almeida

(57) ABSTRACT

A method and apparatus is disclosed which reduces or removes the effectiveness of commercial skip systems such as presently found in VCRs, PVRs, etc. which are designed to delete commercials from signal material upon playback of a previously recorded version of the signal material. In an embodiment, the effectiveness of the commercial skip system is reduced or removed by adding a flat field of selected signal level to active line portions of video lines of the signal material. Other embodiments modify the normal fade to black signal indicative of a commercial to provide a fade to non-black signal. In further embodiments, a fade to non-black signal is inserted in an overscan area of the signal picture. Still further embodiments modify audio signals or selected signals in the horizontal blanking interval which may be used in commercial skip systems to detect the presence of commercials. Still other embodiments provide techniques for overcoming the commercial skip system altering effects of the previously mentioned embodiments to at least partially restore the commercial skip system, or to enhance the reliability or effectiveness of an existing commercial skip system which has not been altered.

72 Claims, 14 Drawing Sheets

U.S. PATENT DOCUMENTS

| | | | |
|---|---|---|---|
| 6,909,837 B1 * | 6/2005 | Unger .......................... | 386/68 |
| 6,937,658 B1 * | 8/2005 | Suito et al. ............ | 375/240.15 |
| 7,012,653 B1 * | 3/2006 | Strickland et al. .......... | 348/731 |
| 7,184,649 B2 * | 2/2007 | Armengaud ................. | 386/95 |
| 2002/0144262 A1 * | 10/2002 | Plotnick et al. ............... | 725/32 |
| 2002/0150380 A1 | 10/2002 | Shigetomi et al. | |
| 2002/0176702 A1 | 11/2002 | Frantz | |
| 2002/0191950 A1 | 12/2002 | Wang | |
| 2003/0001977 A1 | 1/2003 | Wang | |
| 2003/0014747 A1 | 1/2003 | Spehr | |

* cited by examiner

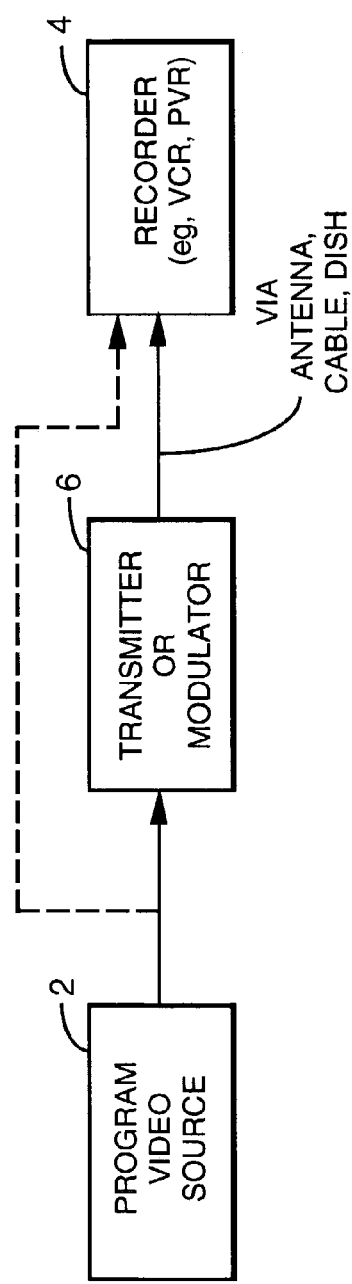
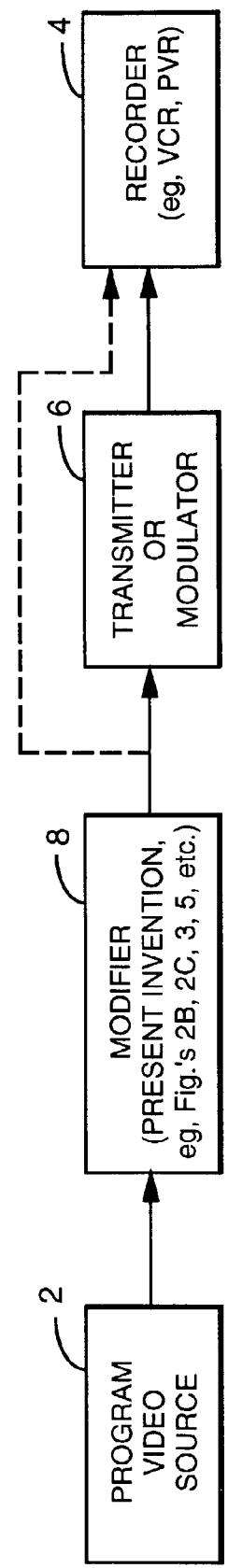

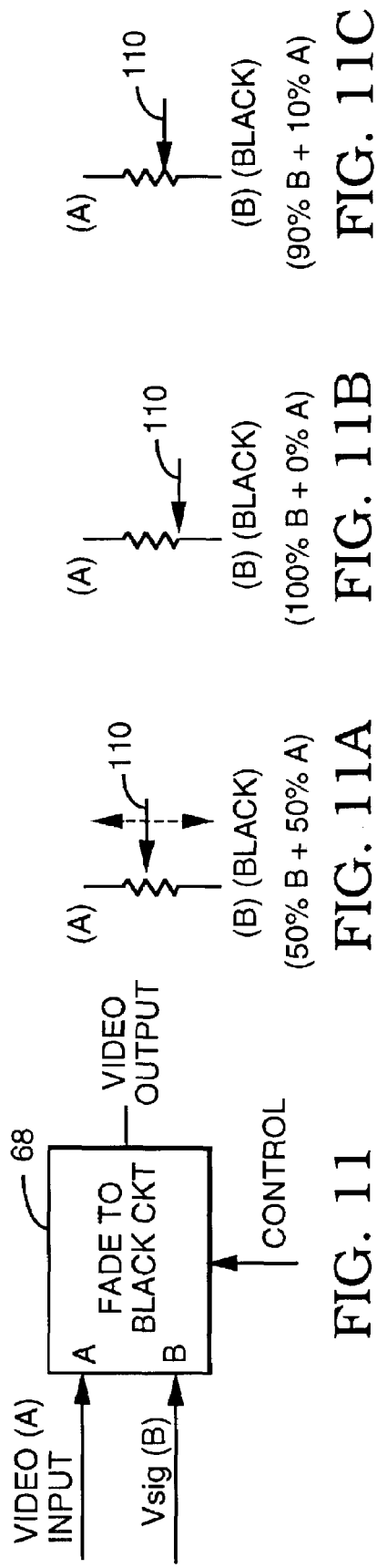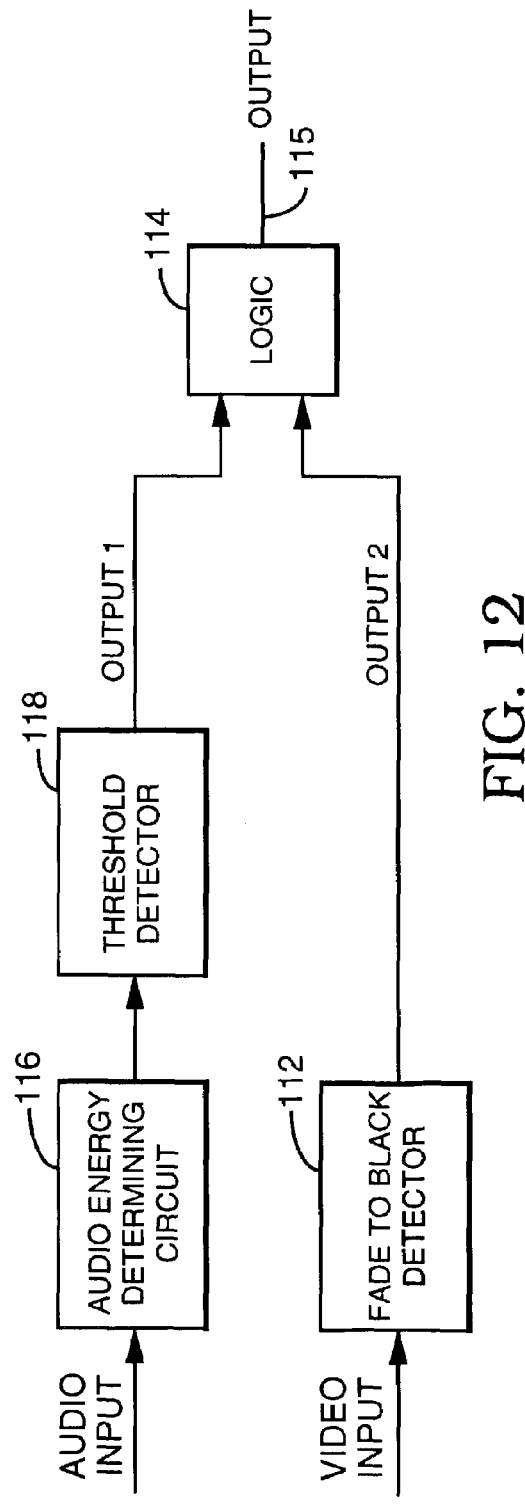

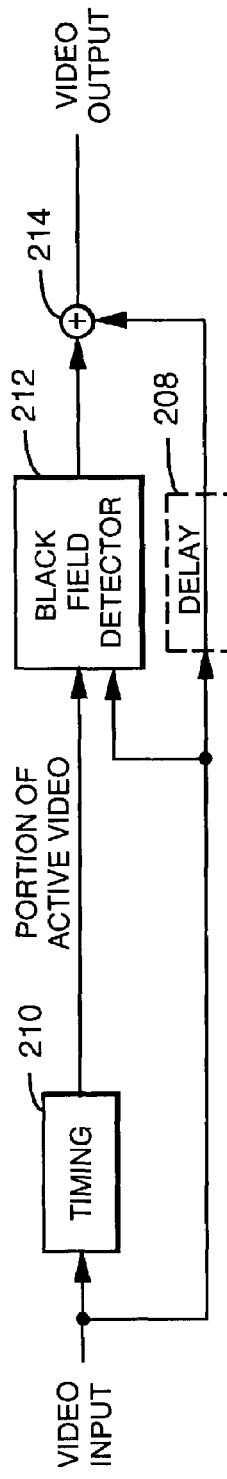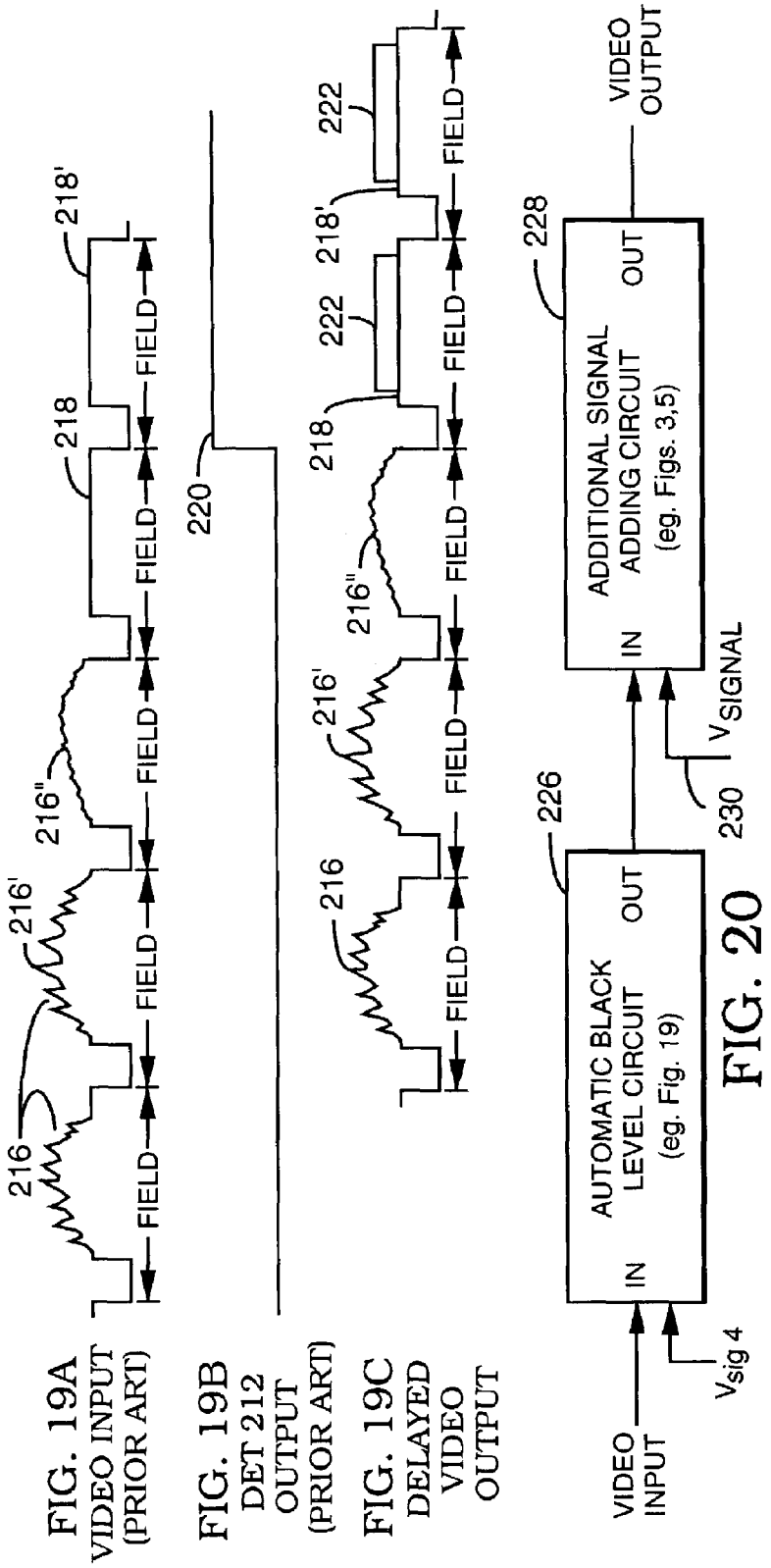

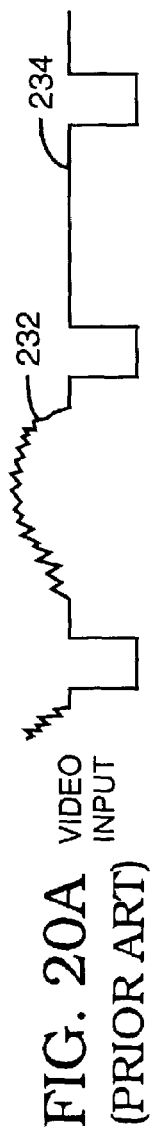
FIG. 20A VIDEO INPUT (PRIOR ART)
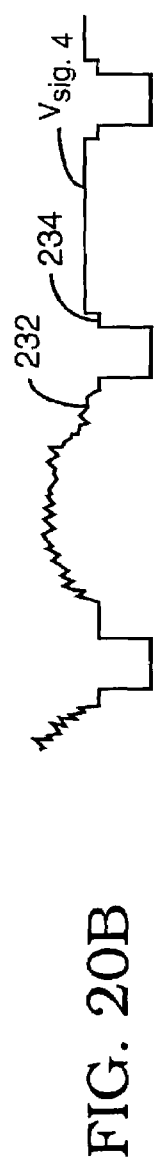
FIG. 20B
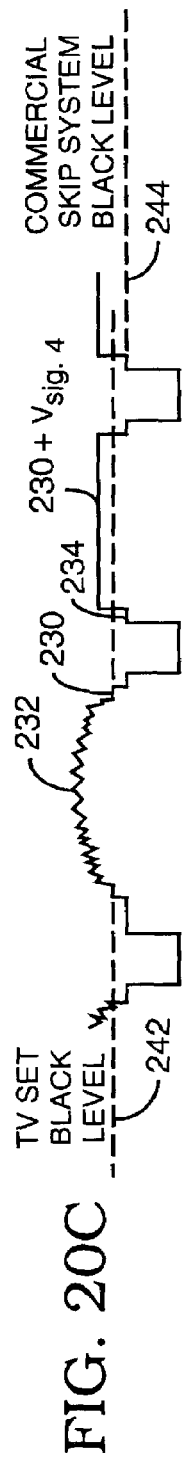
FIG. 20C
FIG. 21A
FIG. 21B
FIG. 21C

METHOD AND APPARATUS FOR REDUCING AND RESTORING THE EFFECTIVENESS OF A COMMERCIAL SKIP SYSTEM

BACKGROUND OF THE INVENTION

The present invention relates to video signal processing in which commercials are selectively inserted into video signal material, and more particularly relates to methods and apparatuses for processing a video (or audio) signal so as to reduce or remove the effectiveness or effects of commercial skip systems such as those presently found in video recorders.

Other methods and apparatuses of the invention relate to at least partially restoring the effectiveness of a commercial skip system which has been reduced or defeated, for example, by the above-mentioned methods and apparatuses.

Currently there are personal video recorders (PVRs) and video cassette recorders (VCRs) which have been modified to include commercial skip circuits which detect the presence of commercials in a recorded video program, and then mark the locations of the commercial for subsequent deletions. To this end, in one version of a commercial skip system, when the recorders are used to record a program, the entire program including the commercials are recorded. If the skip system in the recorder is activated, the recording is shuttled to allow the skip system to detect and then mark the beginning of the commercials in the program. In this embodiment of a commercial skip system, as the marked recording is subsequently played back, the marks indicating a commercial are detected and the recording is for example fast forwarded past the commercial to the point where the program is resumed. Thus, the commercials are, in effect, skipped.

Such a commercial skip system is described for example in U.S. Pat. Nos. 5,333,091 ('091), 5,692,093 ('093) and 5,696,866 ('866) all by Iggulden et al. This system, called "Commercial Advance" system, which has been implemented in some VCRs sold in the US market, employs two basic steps for providing commercial detection and deletion (that is, skipping). In the first step, the Commercial Advance system uses a video event detector, and also may include an audio event detector to detect relevant video events and audio events. The video event detector is mainly based on the detection of black or dark video frames that are frequently observed between commercials. The audio event detector detects generally low audio signals between commercials. By detecting dark video frames (and also "silent scene," low audio signals), Commercial Advance method marks the events and stores them into an event list that can be analyzed later by its commercial detection method in the second step. The commercial detection method detects multiple groups of commercials based on the event list and a set of rules such as the typical commercial length (e.g., 30 seconds) and minimum number of commercials within each group of commercials.

It is readily apparent that a commercial skip system such as those disclosed in the patents ('091), ('093) and ('866) of previous mention rely on analyzing a video data stream for specific timing of detectable events such as blank or black video frames indicative of essentially two portions of the video data stream; commercials and non-commercials. The system stores the timing of the detectable events and then generates a classification signal based on the storage of the detectable events, to thereby cause the skipping of commercials during the subsequent (at least second) playback of the analyzed data stream. It follows that the Commercial Advance system of patents ('091), ('093) and ('866) does not skip commercials in real time or near real time.

In prior art of interest relative to the present invention, U.S. patent application Publications 2003/0001977 A1 ('1977) and 2002/0191950 A1 ('1950) both to X. Wang, disclose apparatus and method for preventing automated commercial detection and is comprised of a commercial transition localization device, a circuit for generating a classification signal and a subsequently applied commercial transition modification device. The commercial transition localization device localizes all commercial transitions within a given video signal after a first examination of the video program and supplies the information to the commercial transition modification device in a later playback process. In a subsequent replay of the video signal, the commercial transition modification device generates a new transition for each found original commercial transition, and replaces the original transitions with the new transitions. The new generated commercial transitions are designed in such a way that they are in general not detectable by automated commercial detection methods used by common commercial detection and elimination systems such as the Commercial Advance system of previous mention. Thus it may be seen that the system disclosed in the patent application publications to Wang is based upon and relies on the two step, non real time technique disclosed in the U.S. Pat. Nos. ('091), ('093) and ('866) discussed previously.

In a version of the system disclosed in publications ('1977) and ('1950) wherein the classification signal is derived automatically, during recording of the video program the derived classification signal requires a memory (RAM) along with a microprocessor and another memory (ROM) for providing analysis. The classification information is stored in the RAM in association with the video signal's time code or time identification to provide the means for controlling the precise timing when subsequently playing back the video program. To provide a workable system it is readily apparent that the video signal, i.e., program, must be played twice. That is, the video program is played a first time to allow for generation of the classification signal, which has a specific timing with respect of the time code of the video program. Subsequently, the video program must be played a second time to synchronize it with the previously stored classification signal, whereupon the normal commercial transitions are replaced with the modified transitions as shown for example in FIGS. 1-3 of the Publication ('1977). Notice that the video signal is not modified outside of the commercial transitions.

In a second version of the system disclosed in Publications ('1977) and ('1950), the classification signal, which identifies the commercial and non-commercial portions of the whole video program, is derived manually. In this version, the video program is played and rewound multiple times to retrieve the exact time locations of each of the many groups of commercials and corresponding commercial transitions. Then after the entire video program is analyzed manually, the manually compiled classification signal is timed with the video program's time code to allow the commercials to be detected and played upon the second playback of the video program, thereby defeating the commercial skip system. As is readily apparent, the system of Publications ('1977) and ('1950) provides for the defeat of a commercial skip system, such as Commercial Advance, in non real time.

It follows that the system of the Publications ('1977) and/or ('1950) does not provide a commercial skip defeat process which operates in real time, nor does it modify the video signal outside of the commercial transitions. That is, the system requires the use of a classification signal, the use of timecode marking on the recorded video program, and the playback of the recorded video program a second time in non real time. The latter drawback produces an unacceptable delay in broadcasting the video program due to the fact that the material must be played back at least a second time. The delay is at least the duration of the video program. For example, a 30 minute program with commercials will produce at least a 30 minute delay before being played back.

Further, the system of the Publications ('1977) and ('1950) relies on a commercial transition modification device which generates a new modified commercial transition for each original commercial transition detected, and replaces the original transitions with the new modified transitions. It follows then that each original commercial transition first must be detected before it can be replaced upon a second playback of the video signal.

However, it is appreciated that production and/or broadcast companies, which depend on income from the presentation of commercials in their programs material, prefer that the effects of commercial skip systems such as Commercial Advance installed in VCRs, PVRs and other recorders, be nullified or otherwise overcome.

SUMMARY OF THE INVENTION

The present invention provides a method and apparatus for overcoming or otherwise circumventing in real time the effectiveness of the commercial skip systems of previous mention, such as disclosed for example in U.S. Pat. No. 5,333,091, U.S. Pat. No. 5,692,093 and U.S. Pat. No. 5,696,866 of previous mention.

To this end, the present invention provides method and apparatus for modifying a video signal in real time, whether it is recorded in digital or analog format, so that the commercial skip system is defeated or rendered less effective in identifying the presence of commercials, whereby the video program is played back without substantially skipping the commercials. As described below, the present invention provides various embodiments which modify the video signal in signal regions including outside of the commercial transitions. The digital or analog recording formats may be used in recorders with any combination of optical devices (e.g. CDR, DVDR), magnetic hardware (e.g. hard disk drive recorders), tape devices (e.g. analog or digital tape recorders) or solid state memory devices.

Thus, the present invention provides for modifying a regular video program when supplied, broadcast, etc., "on the fly," by modifying various video sources in the production or broadcast location, or by modifying various production techniques. This results in a reduction of the effectiveness of a commercial skip system without the use of a classification signal, the use of timecode marking on a recorded video program, the need for playback of the recorded video program at least a second time, or the producing of an unacceptable delay in the broadcasting or modifying of the video program due to having to playback the video program at least a second time. It is readily understood that such a delay is at least the duration of the program; for example, a 30 minute program complete with added commercials will cause a delay of 30 minutes in a production or broadcast of the program for the prior art process.

The present invention also provides method and apparatus for modifying in real time the video signal, that is, program video, in such a way that the commercial skip system falsely detects or senses the presence of commercials when no commercial exists. This causes certain portions of the program video to be skipped upon playback of the recorded program, which in turn discourages a user from the use of the commercial skip system.

Further, the present invention provides for circumventing or reducing (including for example in real time) the effectiveness of a commercial skip system which detects and uses for example a back porch reference, a sync signal reference, etc., to determine the presence of a commercial in program material.

An alternative embodiment of the present invention provides method and apparatus for reducing(including for example in real time) the effectiveness of the various techniques mentioned above for reducing or removing the commercial skip system, so that the commercial skip system and feature is at least partially restored.

In one embodiment of the invention, the effect or effectiveness of the commercial skip system is reduced or removed by adding a selected signal to selected active video lines of the video signal. For example, a flat field of about 5% to about 30% or more white level may be added to active line portions of selected lines of the video signal. The added flat field thus constitutes a raised pedestal or offset of from about 10 to 30 IRE units, which raises accordingly the level of the video signal such that a fade to black signal, indicative of the beginning of a commercial, does not occur. Since the commercial skip system relies on sensing a program scene fading to black in order to mark the time location of a commercial, the system fails to perform its intended function of skipping, that is, deleting, commercials in the program material being played back.

As may be seen, the above embodiment modifies the video signal in portions thereof which are located outside of the commercial transitions, for example, in the active video signal.

Raising the level of the active video portions of the video signal however, causes a corresponding increase in brightness in the viewed program. This brightness change can be compensated for by adjusting the brightness control of the television set upon playback of the video program. In a modification of the above technique further described below, the level of the active video portions are such that the brightness change on playback is not objectionable and compensation therefore is not necessary during playback.

Another embodiment of the invention for removing or at least reducing the effectiveness of the commercial skip system comprises modifying the fade to black signal in such a manner as to produce only a fade to non-black signal such as for example a gray level signal. A chroma signal added to a black level luminance signal also sufficiently reduces the effects of a commercial skip system.

Other non-black signals include for example, a station or network logo, a gray level signal plus a color signal, a color signal alone, a random or varying luminance signal and/or a random color signal.

The fade to non-black signal may take up selected pixels of selected video lines of selected video fields. In addition, the intensity of the fade to non-black signal may be varied as the program video is fading to the non-black signal.

In another embodiment of the invention, a non-black signal such as mentioned above is inserted in the overscan area of the video picture. By way of example, the overscan area may be a few top and/or bottom video lines in an active video field which are not normally seen since they are not in the active video area; that is, are in the overscan region outside of the observable picture displayed on a television set. The overscan area also includes the beginning and/or end of selected video lines outside of the active video line portions, and generally within the horizontal blanking interval (HBI). However, this overscan area may encroach a microsecond or more into the beginning and/or end of the active video portion.

In a modification of the embodiment using a fade to non-black signal, when the normal fade to black signals are to be inserted at the beginning of a commercial, a partial fade to black is inserted instead. For example, a switcher or fader device may provide only 80 or 90% of a fade to black signal, thereby providing in essence a fade to non-black signal.

Depending upon whether the commercial skip system employs a detector circuit which detects a back porch reference or a sync tip reference, other modifications of the video signal may be made to at least reduce the effectiveness of the commercial skip system. For instance, if a back porch reference is used by the commercial skip system to detect commercials, then lowering a portion of the back porch so as to cause an erroneous reference level for the detection circuit can reduce the commercial skip system effectiveness.

If a sync tip signal is used as a reference, then increasing the sync level can also provide an erroneous reference level and attendant reduction of skip system effectiveness.

In still a further embodiment, the program video is modified by inserting false fade to black signals from time to time so as to stimulate fading from a program video to black as for a commercial. So for example, instead of cuts from scene to scene, inserting a fade to black followed by a cut to the scene is a way of causing positive signals which falsely indicate the presence of a commercial in the program video. The end result is that the VCR or PVR skips portions of the program video which in turn discourages a user from employing the commercial skip feature built into the VCR or PVR.

In yet further embodiments of the invention, method and apparatus are provided for overcoming audio signal level sensing techniques employed in a type of commercial skip system which detects a higher than normal average audio signal level indicative of the presence of a commercial in the respective video signal. To this end, the present invention further contemplates a unique technique for detecting the presence of commercials utilizing audio information in the audio signal.

The present invention further contemplates method and apparatus for defeating or at least reducing, the effectiveness of the various commercial skip system defeating embodiments described above, so that the commercial skip system is at least partially restored.

To this end, given the above discussed skip system defeating embodiment in which the video signal pedestal or offset has been increased to reduce or defeat the skip system, a negative signal such as about a −5% to about −15% white signal is added to selected portions of active video lines of the video signal to at least partially restore the commercial skip system.

In another skip system restoring embodiment which counters the above discussed skip system defeating embodiment in which a non-black signal is inserted or added to selected portions of the video signal such as the overscan area, the fade to non-black signal is modified by replacing or attenuating at least a sufficient portion of the non-black signal to allow at least partially restoring the commercial skip system.

BRIEF DESCRIPTION OF THE DRAWINGS

FIG. 1A is a block diagram illustrating a typical prior art apparatus for marking and skipping commercials included in a video signal. Such apparatus is herein referred to as a commercial skip system.

FIG. 1B is a block diagram illustrating the addition of apparatus in accordance with the present invention within the prior art environment of the apparatus of FIG. 1A to reduce or defeat the effectiveness of the commercial skip system.

FIG. 11A is a block diagram illustrating an embodiment of the invention which modifies a normal fade to black signal to provide a partial fade to black signal wherein a portion of the program video remains prior to implementing a fade to full commercial.

FIG. 12 is a block diagram illustrating circuitry in a type of commercial skip system which detects the presence of commercials by sensing audio information included in the audio signal.

FIG. 19 is a block diagram illustrating yet another embodiment of the invention which adds a signal to a video signal that contains at least a video field of black level, to reduce the effectiveness of a commercial skip system.

FIGS. 19A-19C are waveforms illustrating the signals generated at various points of the circuit of FIG. 19.

FIG. 20 is a block diagram illustrating another embodiment of the invention which combines the addition of a signal to a black field while also adding a signal to active portions of the video signal, to reduce the effectiveness of a commercial skip system.

FIGS. 20A-20C are waveforms illustrating the signals generated at various points of the circuit of FIG. 20.

FIGS. 21A-21C are graphs illustrating examples of non-linear transfer functions corresponding to associated embodiments of the invention.

DETAILED DESCRIPTION OF THE PREFERRED EMBODIMENTS

FIG. 1A illustrates a typical apparatus for delivering a video signal (alternately referenced to herein as program video, video program or program material) from a program video source 2 to a recorder 4 such as a video cassette recorder (VCR), or a personal video recorder (PVR), etc. The program video source 2 is coupled to a transmitter or modulator device 6 and thence to the recorder 4 via for example an antenna, cable, dish, etc., delivery system. As depicted via a dashed line, the program video alternatively may be delivered directly to the recorder 4. In this example of the prior art apparatus, the recorder 4 contains a commercial skip system which may be enabled by a user such that commercials included in the program video of source 2 will be skipped in the course of a recording or playback process. It is to be understood that the VCR or PVR may include a storage unit which may include a hard drive, a CD ROM, a tape transport, a DVD ROM, a DVD-R, CDR, CDRW, RAM or ROM etc.

The various embodiments of the present invention are concerned with reducing or defeating the effectiveness of such a commercial skip system contained in the various types of recorders. Several of these embodiments can be adapted to enhance the effectiveness of a commercial skip system, along with further embodiments for providing such enhancement.

To this end, FIG. 1B illustrates the addition of the invention to the apparatus of FIG. 1A as a modifier circuit 8 inserted between the program video source 2 and the transmitter or modulator device 6. In accordance with the invention, the modifier circuit 8 alters the characteristics of the program video such that the effectiveness of a commercial skip system contained in the recorder in sensing and skipping commercials during record and/or playback will be reduced or defeated. The modifier circuit 8 for example may raise black levels of at least certain portions of selected video fields in the video signal to thereby cause the commercial skip system in the recorder 4 to have the reduced effectiveness.

Figure 2A:
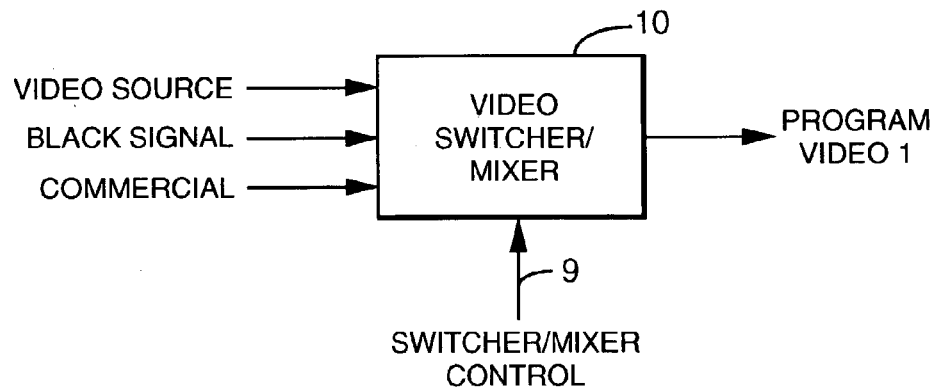
FIG. 2A is a block diagram illustrating a typical prior art video switcher or mixer apparatus in a broadcast or cable environment.

FIG. 2A illustrates a typical video switcher or mixer device 10 (for example, in a broadcast or cable environment). As depicted, a video source, such as the program video source 2 of FIGS. 1A, 1B, supplies program video such as a movie or the like to one input of the video switcher or mixer device 10. Another input of device 10 typically receives a black level signal via for example an internal or external source. Another input of the device 10 is supplied with commercials via a commercial source. In the process of showing a commercial contained in the program video, in response to a switcher/mixer control signal at control input 9, the program video is faded to the black level signal and thence is faded or switched to a commercial at the end of the black level signal. Upon reaching the end of the commercial, the black level signal is again applied whereupon the program video is mixed, faded or switched back in at the end of the black level signal.

It follows that a commercial skip system may use the characteristic of a fade to black transition to detect and/or identify a commercial and to then mark and thereafter skip the commercial during a recording and/or playback process.

Figure 2B:
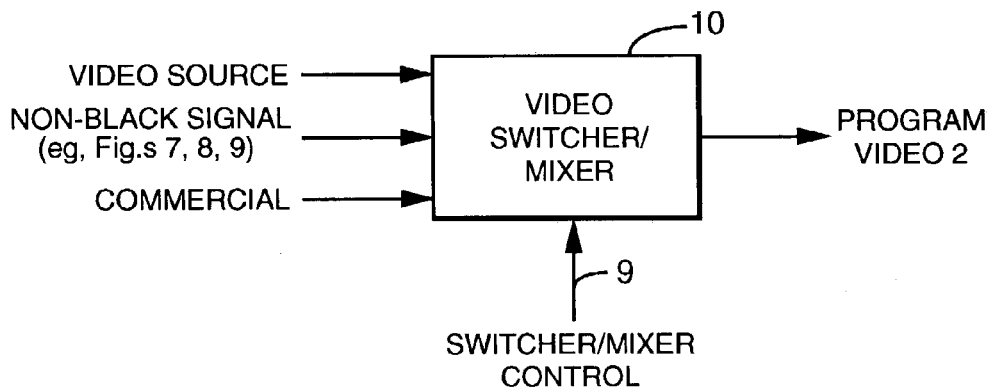
FIG. 2B is a block diagram illustrating a basic configuration of the invention which uses the signals generated in the video switcher or mixer apparatus to reduce or defeat the commercial skip system.

FIG. 2B illustrates an embodiment of the invention wherein a non-black (level) signal is substituted for the black (level) signal supplied to switcher or mixer device 10 in response to the control signal on input 9. In accordance with the invention, when the switcher or mixer device 10 now fades to a non-black signal instead of the fade to black signal of FIG. 2A, the recorder 4 (FIG. 1B) will have trouble detecting the commercial. Thus, the commercial skip system contained in the recorder 4 will have reduced effectiveness in that it no longer can effectively identify the presence of commercials.

Figure 2C:
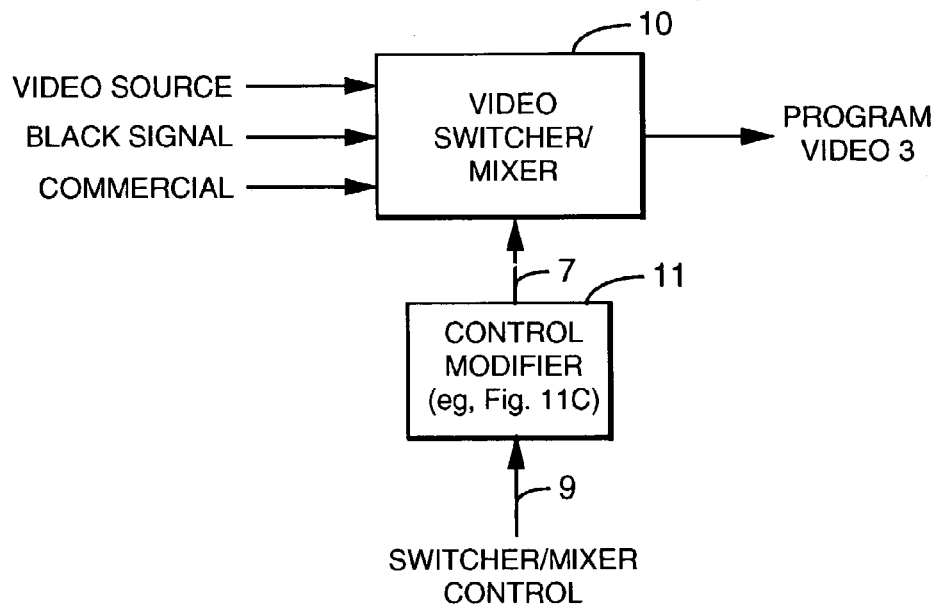
FIG. 2C is a block diagram of another basic configuration of the invention.

FIG. 2C illustrates another embodiment of the invention wherein the switcher/mixer control is altered so as to not fade to black completely, i.e., to partially fade to black, before going to a commercial. To this end, a control modifier circuit 11 modifies the switcher/mixer control signal on input 9 to provide a modified control signal on input 7 of the switcher or mixer device 10 such that the black signal is not completely transitioned in upon fading from the program video. Here, as in FIG. 2B, a recorder (4 of FIG. 1B) cannot effectively detect or identify the presence of commercials, whereby an integral commercial skip system will not function effectively.

Figure 3:
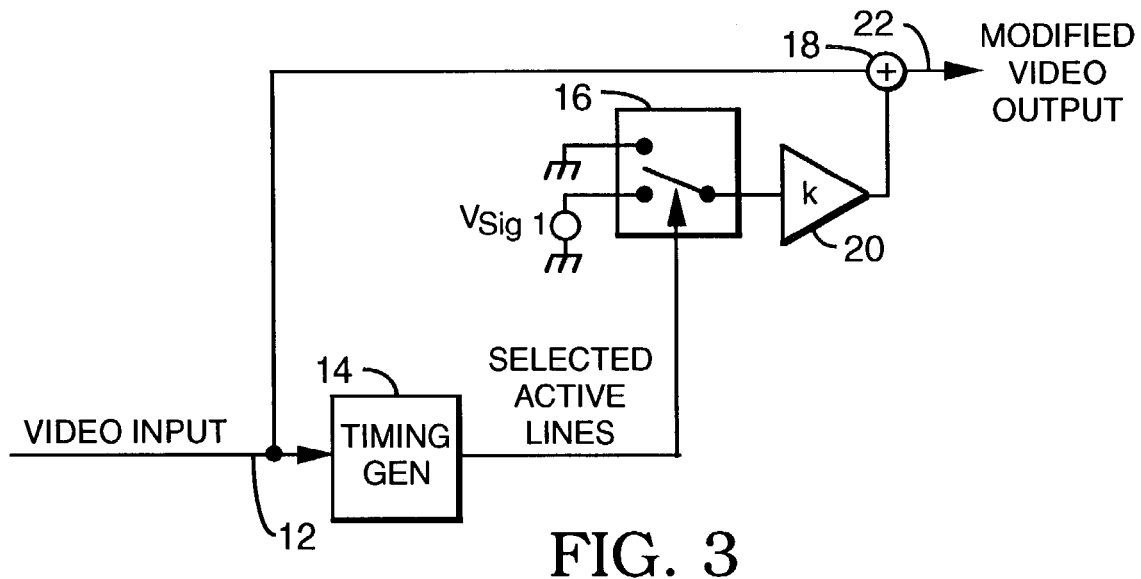
FIG. 3 is a block diagram illustrating an embodiment of the present invention which adds a signal to selected active portions of video lines in a video signal.

FIG. 3 illustrates an embodiment of the invention which provides a modified output signal which may be transmitted or otherwise supplied to VCRs, PVRs or other memory devices of previous mention. The PVRs may include the hard drive and/or optical disk technology such as for example the CDR and/or DVD devices, wherein a video signal such as program video is supplied via an input 12 to a timing generator 14 formed of for example a sync separator and video line counters. The output of the timing generator 14 is a control signal having a selected logic level for selected active video lines and which is supplied to a control input of a switch 16. Switch 16 has one input coupled to ground and a second input to an offset signal Vsig.1. The control signal controls switch 16 to gate the offset signal Vsig.1 directly to a summing circuit 18, or optionally to the circuit 18 via an optional amplifier 20. The video signal on input 12 also is supplied to a second input of the summing circuit 18 whereby the output of circuit 18 on an output 22 is the video signal with the offset signal Vsig.1 added to the video lines selected by the timing generator 14 via the switch 16. By way of example, the signal Vsig.1 may comprise a positive signal which simply is added in the active field and video line portions of the video signal, to the exclusion of the sync signal and/or the horizontal blanking interval.

Since raising the level of the active video signal also raises the brightness level of the displayed scene on the television set, it may be necessary to lower the brightness by turning down the brightness control on the television set upon playback of the video signal.

Figure 4:
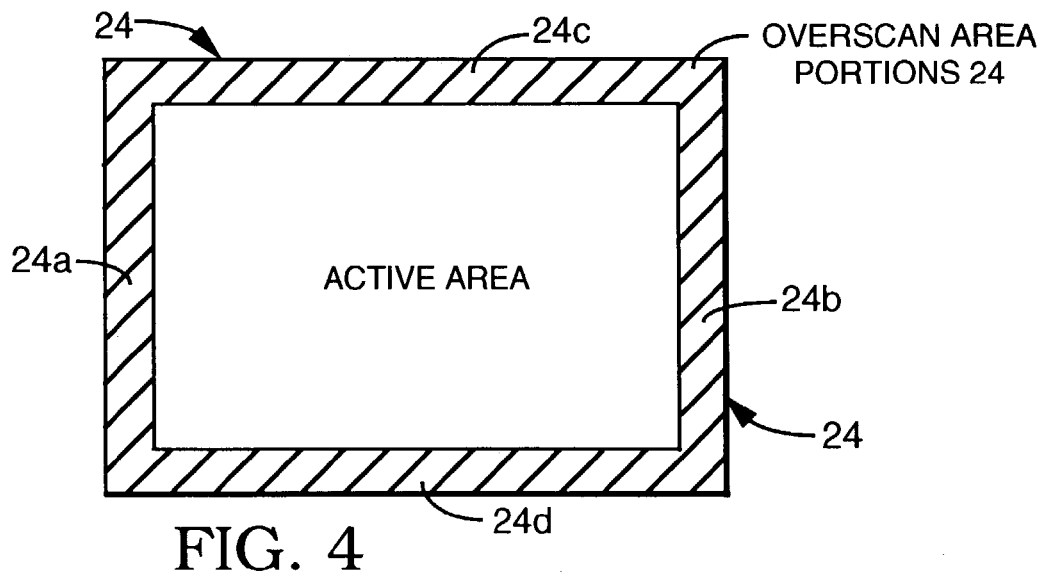
FIG. 4 is a view of a television raster illustrating an area outside the active video area, commonly referred to as the overscan area, wherein the added signal of FIG. 3 may be inserted into a selected portion or portions of the overscan area.

FIG. 4 illustrates an alternative embodiment which provides a modified output signal which may be transmitted or otherwise supplied to recording apparatus such as the VCRs, PVRs, etc., of previous mention, and which employs a technique of applying an added signal, such as the offset signal Vsig.1 generated in FIG. 3, in an overscan portion, or portions, 24, of the active video area of a video signal. Although the overscan areas include the active video portions 24, the areas are not displayed in the television picture because of the inherent overscan characteristic of television sets. More particularly, the overscan portions may include beginning and end of video lines 24a, 24b, respectively, and selected video lines at the top and bottom of the active video field 24c, 24d, respectively.

Figure 5:
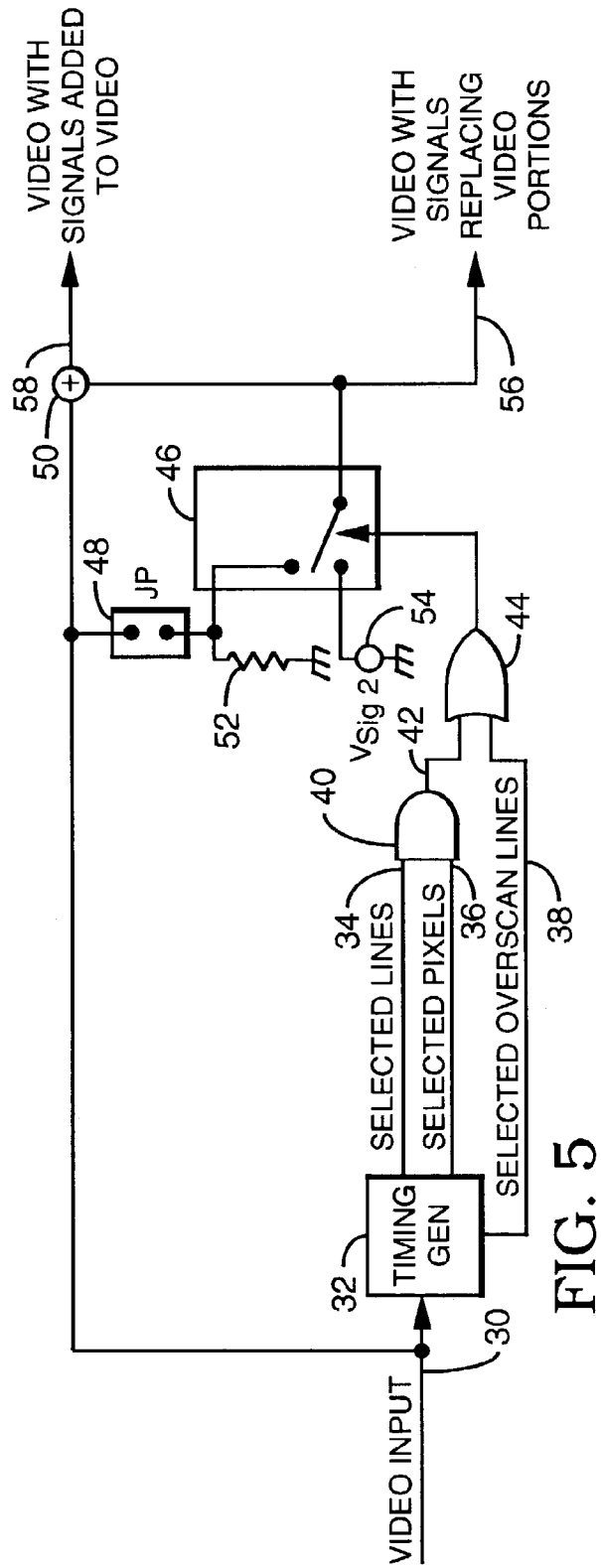
FIG. 5 is a block diagram further illustrating the embodiment of FIG. 3, and wherein a signal is added to selected active video lines and/or to selected portions of the overscan area. The added signal may encroach into the horizontal blanking interval.

FIG. 5 illustrates a general circuit which provides a modified output signal which may be transmitted or otherwise supplied to VCRs, PVRs, etc., from for example a broadcasting facility, for adding or inserting an additional signal in real time to selected lines and/or pixels of a video signal, such as previously discussed with respect of FIGS. 3 and 4. In addition, the circuit also illustrates means for adding or inserting the additional signal to selected overscan portions (24) of the active video signal previously depicted for example in FIG. 4.

To this end, a video signal in which a commercial skip system would normally detect commercials, is supplied via input 30 to a timing generator 32 similar to timing generator 14 of FIG. 3. Timing generator 32 provides several output signals including for example a selected lines signal, a selected pixels signal and a selected overscan lines signal, on lines 34, 36 and 38, respectively. Lines 34 and 36 are coupled to inputs of an AND gate 40, whereby gate 40 supplies a signal via a line 42 with a selected logic state indicative of selected video lines and selected video pixels. The signal output from the AND gate 40 is supplied to an OR gate 44 along with the overscan lines signal on line 38. The output of the OR gate 44 is supplied to the control input of a switch 46.

The video signal is also supplied to one terminal of a jumper 48 as well as to an input of an adder 50. The second terminal of the jumper 48 is coupled to a resistor 52 and to a first input of the switch 46. Resistor 52 is coupled to ground. A second input of switch 46 is coupled to a voltage source 54 which supplies a signal Vsig.2. The output of switch 46 is coupled to a second input of the adder 50 and also provides an output signal on an output 56.

When the jumper 48 is closed, the video signal is supplied to the first input of switch 46 and, in response to the selected logic level of the control signal from OR gate 44, inserts the waveform signal Vsig.2 into the video signal during the selected pixels and/or the selected lines, or the selected overscan lines, as determined by the control signal supplied to switch 46. The resulting output signal on output 56 comprises a modified video signal with a waveform of the signal Vsig.2 inserted during the duration of the selected pixels and/or lines. When the jumper 48 is opened, the video signal on input 30 is supplied to the adder 50 and, in response to the control signal, the switch 46 supplies the signal Vsig.2 to the adder 50 during the selected pixels, lines and/or overscan lines. Signal Vsig.2 is added to the video signal during the selected pixels and/or lines and the combined signals are output as a modified video signal on an output 58.

Figure 5A:
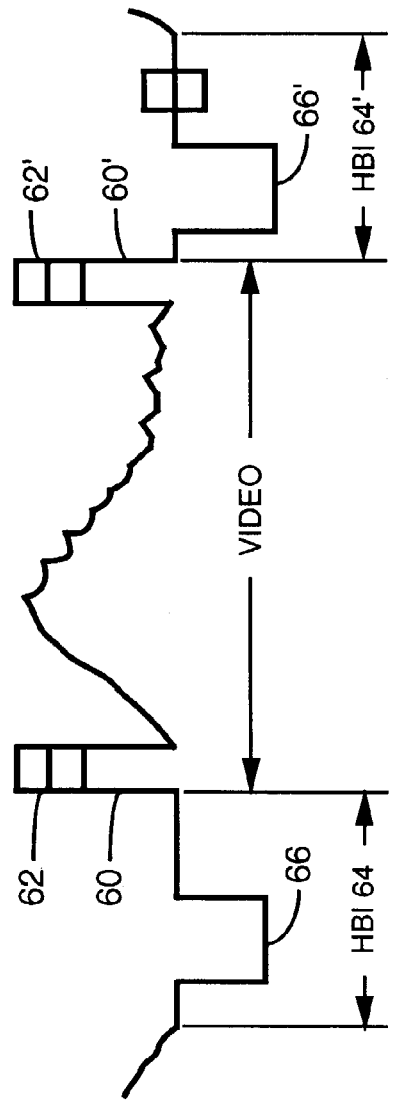
FIG. 5A is a waveform illustrating an addition of a luminance signal as well as a chroma signal in the overscan area of the video picture.

FIG. 5A is a waveform illustrating the output signals on outputs 56, 58 of FIG. 5 which are applied to a video signal's selected pixels of selected lines. As depicted, the beginning of an active video line is modified by inserting or adding a signal, such as the signal Vsig.2, herein illustrated as a luminance component signal 60 and/or a chroma component signal 62. In addition, the ending of the active video line may be modified by inserting or adding a similar signal; that is, a luminance component signal 60' and/or a chroma component signal 62' thereto. It is understood that the locations of these signals may vary. For example, the duration of the HBI 64, HBI 64', may be changed such as to thereby allow the signals to be expanded in duration and/or to be located nearer to the respective sync pulse 66, 66'.

Figure 6:
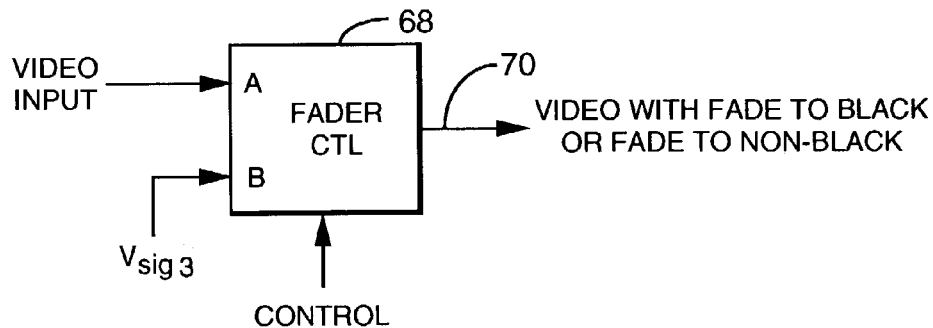
FIG. 6 is a block diagram illustrating another embodiment of the invention comprising a fader circuit for applying a fade to non-black signal in place of a fade to black signal.

FIG. 6 illustrates the technique employed, for example at a broadcasting facility, where the usual fade to black signal is replaced by a fade to non-black signal Vsig.3 in accordance with the present invention.

To this end, a fader control circuit 68 receives a video signal (e.g., program video) on an input A and a Vsig.3 signal (e.g., a non-black signal) on an input B and, in response to a control signal such as the control signal of FIG.

5, switches from the fade to black signal to the fade to non-black signal and outputs the resulting signal on an output 70.

Figure 6A:
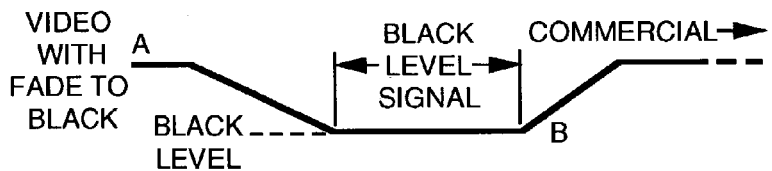
FIGS. 6A-6C are waveforms generated by the circuit of FIG. 6.
Figure 6B:
Figure 6C:
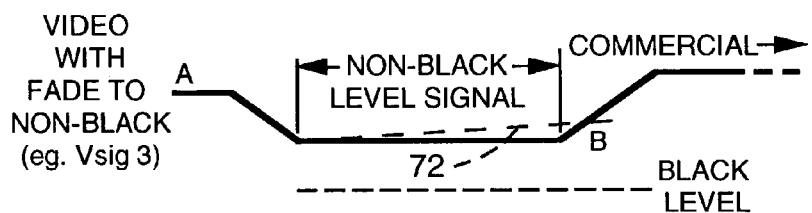

FIGS. 6A-6C illustrate the various signals discussed in respect of FIG. 6. Thus, FIG. 6A illustrates a normal incoming video signal at input A of FIG. 6, and the conventional fade to black signal which is applied leading into a commercial break. FIG. 6B illustrates a control signal applied to the control input of the fader control circuit 68. FIG. 6C illustrates the resulting output signal provided by the fader control circuit 68 in response to the control signal; namely the switching from the fade to black to a fade to non-black signal Vsig.3. Also depicted is a Vsig.3 signal which may be varied in time. To this end, FIG. 6C exemplifies in dashed line 72 such fade to non-black signal which is increasing in amplitude as the fader control circuit 68 fades to the B input, i.e., fades with a varying Vsig.3.

Figure 7:
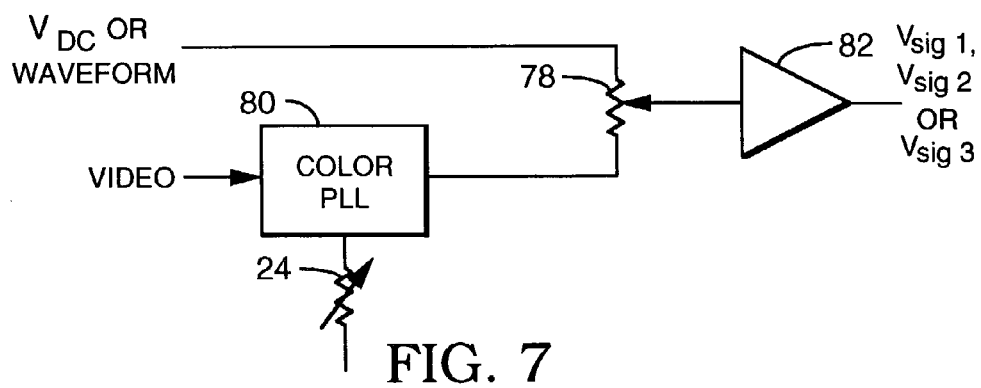
FIG. 7 is a block diagram illustrating a circuit for generating a non-black signal from luminance and/or chroma components.

FIG. 7 illustrates a circuit which may be used for synthesizing the signals Vsig.2 or Vsig.3. Thus, a DC signal or a waveform signal is supplied to an adjustable potentiometer 78 or mixer. A video signal is applied to a color phase locked loop (PLL) circuit 80, or equivalent subcarrier generator, which supplies a color subcarrier signal to the adjustable potentiometer 78. Adjustment of the potentiometer 78 setting determines the mixture of DC or waveform signal with the color subcarrier signal which in turn may be used as the signals Vsig.2 and Vsig.3 of the signal sources shown for example in the embodiments of FIGS. 5 and 6, or may be used as the signal Vsig.1 in the FIG. 3. The signals Vsig.2 or Vsig.3 are supplied from the potentiometer (or fader or mixing circuit) 78 via an amplifier 82.

Figure 8:
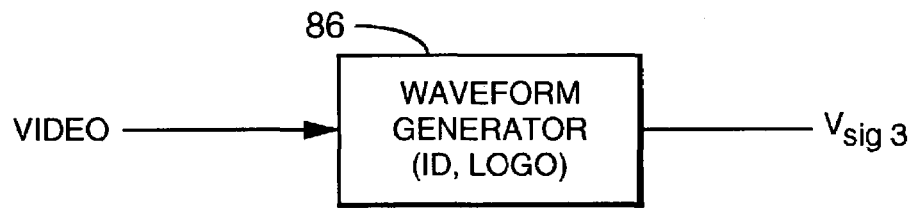
FIG. 8 is a block diagram illustrating a circuit for generating a fade to logo, fade to station ID, etc.

FIG. 8 illustrates an alternative circuit for generating a signal Vsig.3. To this end, a video signal is supplied to a waveform generator 86 for example which synthesizes or recalls from memory a company logo, station ID, etc., which then is used as the non-black signal of previous discussion.

Figure 9:
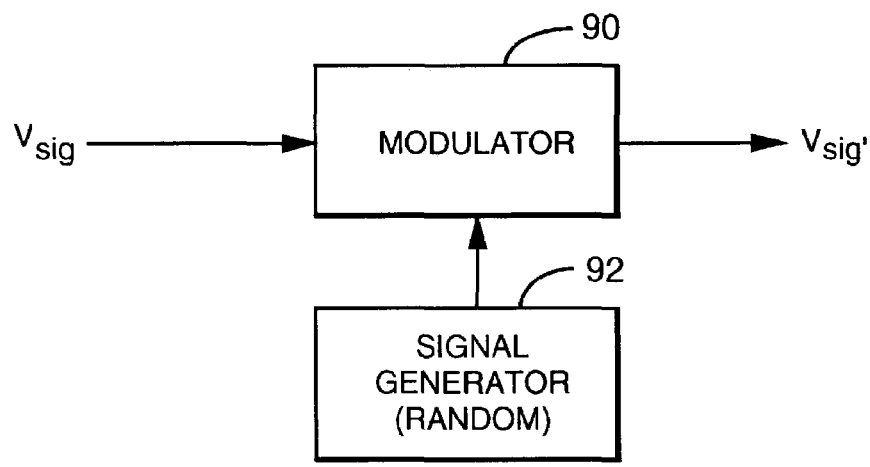
FIG. 9 is a block diagram illustrating yet another embodiment of the invention wherein the non-black signal is modulated with a selected signal source.

FIG. 9 illustrates a circuit for modifying the signals Vsig.1, Vsig.2 or Vsig.3, wherein the signal Vsig (i.e., 1, 2 or 3) is supplied to a modulator 90. A random signal generator 92 supplies a random signal, a periodic or non-periodic signal, a pseudo random signal or a preprogrammed signal to the modulator 90, which then modulates the incoming Vsig to provide an output of modulated Vsig' in accordance with the modulating signal from the generator 92. The modulator 90 may be an amplitude and/or phase modulator which thus may amplitude and/or phase modulate the signal Vsig.

Figure 10:
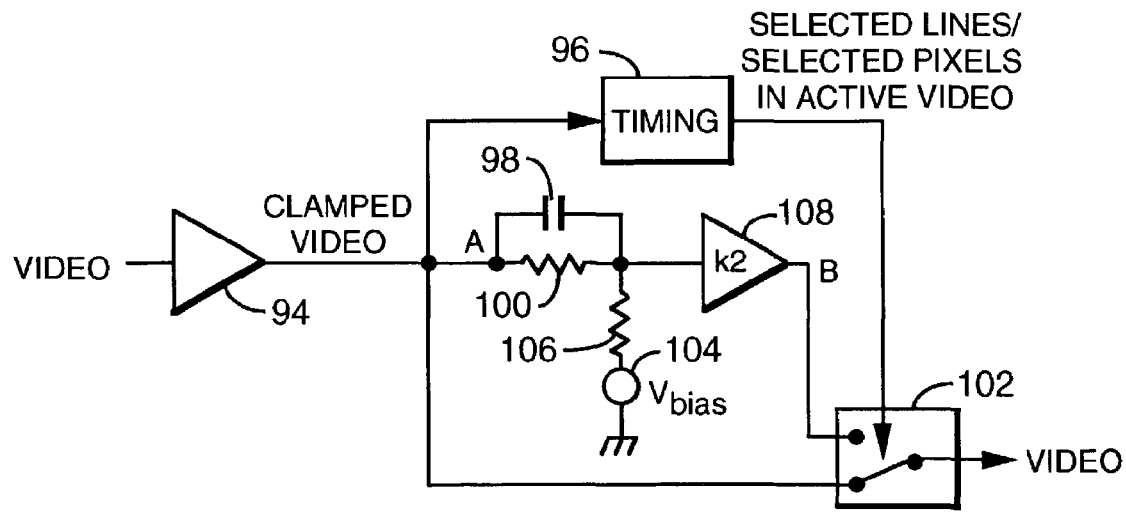
FIG. 10 is a block diagram illustrating still another embodiment of the invention which includes AC coupling to modify a video signal so as to reduce a commercial skip system's effectiveness.

FIG. 10 illustrates an alternative embodiment of the invention which provides a modified signal which may be transmitted or otherwise supplied in real time to VCRs, PVRs, etc., from a broadcasting facility, wherein the circuit modifies the video signal by causing a variable offset or video pedestal in response to the average picture level (APL) of the video signal. Instead of adding a fixed offset voltage signal to the active video signal, this embodiment decouples at least a portion of the black level restoration effect on the video signal. To this end, a video signal is supplied to an amplifier 94 which in turn supplies, via a point A, a clamped video signal to a timing circuit 96, to a common connection of a capacitor 98 and resistor 100, and to one input of a switch 102. The other common connection of capacitor 98 and resistor 100 is coupled to a signal source 104 supplying a signal Vbias via a resistor 106, and also to an amplifier 108. The timing circuit 96 is coupled to a control input of the switch 102 while the amplifier 108 is coupled to a second input of the switch 102.

When the incoming video signal (for example, program video) fades to black at the input of the circuit, the at least partially AC coupled circuit consisting of capacitor 98 resistors 100, 106 and the signal Vbias, causes the video signal to have a partial loss of DC restoration. The output of the partially AC coupled circuit is supplied to the amplifier 108 and the output of the latter is supplied at point B to the switch 102. The switch 102 inserts the partially AC coupled signal in place of the original input video signal for specific lines and/or pixels in response to a timing control signal from the timing circuit 96. As a result, a fade to black signal may not fade to a black level, or a fade to black signal may have a lag time which occurs before the black signal settles in. Alternatively, the output signal of the switch 102 may fade to black for a short interval before a gray level settles in. The resulting video signal is supplied at the output of the switch 102. Therefore, the system of FIG. 10 modifies the selected active video portions of the video signal by at least partially AC coupling (or partially DC restoring) the video signal. This reduces the effectiveness of the commercial skip system.

Figure 10A:
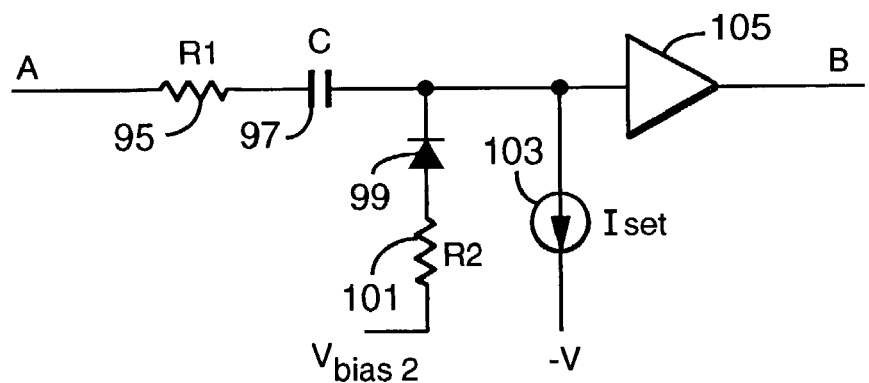
FIGS. 10A, 10B and 10C are schematic diagrams illustrating modifications to the circuit of FIG. 10, wherein the modifications replace the circuit extending from points A to B in FIG. 10.

FIG. 10A illustrates an alternative embodiment of the invention of FIG. 10, which uses a partial DC (or black level) restoration technique as means to adaptively adjust the black levels of a video signal on the basis of the average picture level (APL), that is, on the content in the video picture. More importantly, this technique allows the black level to "float" up during low average picture level (APL) levels while maintaining substantially correct black levels for higher APL levels such as mid or peak whites. It also is possible to use a circuit which partially clamps a video signal to achieve results similar to those discussed above.

In FIG. 10A, clamped video from for example the amplifier 94 of FIG. 10, is supplied to a resistor 95 and thence to a capacitor 97 which is coupled to a diode 99, a current source 103 and an amplifier 105. The diode 99 is coupled to a voltage source Vbias2 via a resistor 101. The location of FIG. 10A with respect of FIG. 10 is defined by the points labeled A and B in the FIGS. 10 and 10B.

In FIG. 10A, depending on the values of the capacitor 97 and the resistors 95 and/or 101, and with a selected current flow setting of Iset for the current source 105, a video signal will exhibit a certain amount of sync clipping that is related or proportional to the APL, which then causes black levels to drop with a greater APL. Therefore either or both resistors 95 or 101 are chosen as a finite value, preferably non zero, so as to allow a certain amount of sync clipping to occur given a current flow setting of Iset. Vbias 2 is set to allow that at low APL levels, the blanking level is higher than normal (e.g., 7.5 IRE in NTSC), while at high APL, the black level is at least close to a normal black level (e.g., −5 IRE to 10 IRE). The output of the amplifier 105 is then fed to a circuit such as the switch 102, FIG. 10, that inserts active video portions to a standard sync signal, which may include a color burst signal. The resulting signal is then a video signal that may be used to reduce the effectiveness of a commercial skip signal.

Also depending on the values of the capacitor 97 and resistors 95, 101, and Iset, this circuit may partially DC restore the video signal. For example, if resistor 95 is close to zero ohm and the capacitor 97 is about 39 micro-farads, resistor 101 is set to about 1000 ohms, Iset is adjusted to about 45 micro amps and Vbias 2 is set to about 0.7 volt, the output of amplifier 105 will show a normal blanking level (e.g., about zero volt for back porch level) for a 100% flat field, while a color black signal will show a raised level (e.g., the 7.5 IRE black level with blanking level raised by about 10 IRE). Thus when a scene fades to black, the circuit of FIG. 10A adjusts in a seamless fashion to raise or float the black level. With active portion(s) of the output of amplifier 105 inserted or switched in with standard sync and/or color burst, FIG. 10A forms a processing circuit that seamlessly adjusts the black level according to the video signal's APL.

The response time of the adjustment or floating of black level may be changed by varying the values of capacitor 97 or of Iset's current flow. Also, in the example where Iset is adjusted for 45 micro amps, Iset may be replaced with one end of a (135,000 ohm) resistor coupled to the cathode of the diode 99 and with the other end of the (135,000 ohm) resistor coupled to a negative (6 volt) supply. Of course, other components or component values are possible to implement a partial DC restoration circuit that is part of a system to reduce the effectiveness of a commercial skip system. For example, see FIG. 10B.

It should be noted that taking a sample in the HBI such as in a portion of the back porch or a portion of sync tip of the output of FIG. 10A will generate a voltage usable for biasing active portions of a video signal to result in a reduction in effectiveness of a commercial skip system. In this instance, the sampled voltage varies according to an APL, with a smaller voltage sample provided for large APLs and with a larger voltage sample provided for smaller APLs, such as a black scene. This sampled (e.g., sample and hold) voltage is then gated through an active pixel timing generator (not shown) to sum with the program video signal, which then results in a raised or floated black level, while keeping substantially correct black levels for a higher APL condition such as near 100% APL.

Figure 10B:
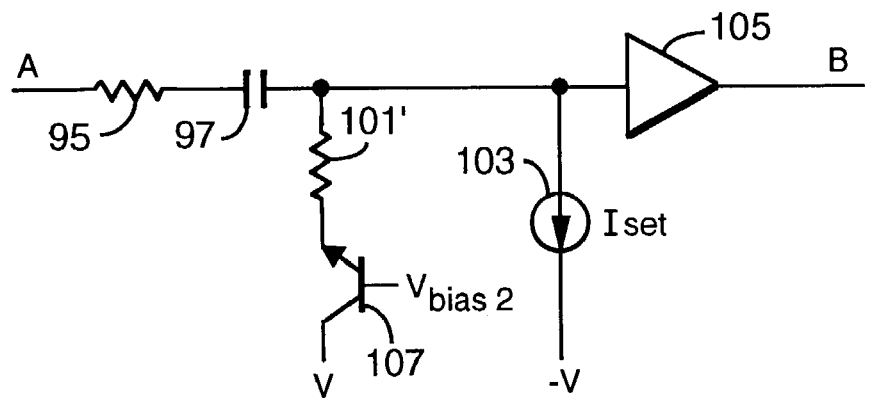

In order for the circuits of FIGS. 10A and 10B to provide partial DC or black level restoration, the resistor 95 may be driven by a low impedance or may be deleted. Thus, there is a lossy resistance in series with the (DC restoration) diode 99 to provide achieving partial DC restoration, or black level restoration, for example, as means for reducing the effectiveness of the commercial skip system.

FIG. 10B illustrates an alternative implementation of FIG. 10 and 10A wherein a resistance in series with a diode in a DC restoration circuit causes partial DC restoration of a video signal. As depicted in the partial or "soft" DC restoration circuit of FIG. 10B, the diode may be replaced with a transistor 107 (or FET), whereby the emitter or source is coupled to the series resistor 101', the base or gate is coupled to a bias voltage Vbias2, and the collector or drain is coupled to a supply voltage V.

Figure 10C:
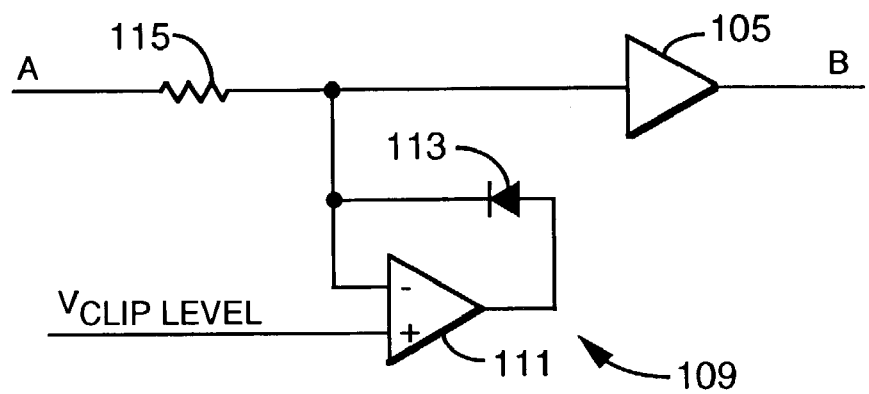

FIG. 10C illustrates another implementation of FIG. 10 comprising a negative peak clipping circuit. Clamped video is input at the point A (see FIG. 10) and is supplied via a resistor 115 to a peak clipper 109 formed of a differential amplifier 111 and a diode 113. The positive input of amplifier 111 is supplied with a voltage Vclip level, and the negative input is coupled to a line extending from the resistor 115 to the amplifier 105.

In FIG. 10C the video signal is clipped via the negative peak clipping circuit 109 at a selected clip level, which may be for example, about 10 to about 15 IRE. The resulting signal supplied to the amplifier 105 then is essentially the active video signal without the normal sync and color burst signals. The sync and color burst signals are added back into the negatively clipped video signal via the switch 102 (FIG. 10), whereupon the video signal from the circuit of FIG. 10 contains raised active video portions, which cause a reduction in the effectiveness of the commercial skip system.

The fader control circuit 68 of FIG. 6 is further depicted in FIG. 11. FIG. 11A illustrates the technique used to achieve the fade signal by varying the proportions of the incoming video signal at input A versus the Vsig signal at input B via the location of an adjustable resistance contact 110. FIG. 11B illustrates the generation of a normal fade to black signal by adjusting the contact 110 to obtain 100% of Vsig at input B and 0% of the video signal at input A. FIG. 11C illustrates an alternative technique of providing an output which partially fades to black by selecting a proportion of 90% of the Vsig and 10% of the video signal. It is readily apparent that the percentages of the signals may be varied via the contact 110 to provide a desired effect, but the general desire is to not fade to black completely before the commercial is subsequently faded in. The fader or switcher control circuit as described in FIG. 6 may be used in a broadcast facility to provide the modified signals for reducing the effectiveness of the commercial skip system in real time.

An alternative commercial skip system may employ commercial detection circuitry which not only receives a video signal but also receives and uses audio signal information to provide commercial detection. FIG. 12 illustrates a commercial detection system which includes sensing the audio information to provide for commercial detection such as for example in a commercial skip system of the type which detects an increase in audio signal level as well as a change in the video signal level to determine the presence of a commercial. To this end, a video signal is supplied to a fade to black detector (or a black field detector) 112 whose output is supplied to a logic circuit 114. An audio signal is supplied to an audio energy determining circuit 116 whose output is supplied to the logic circuit 114 via a threshold detector 118. The determining circuit 116 is designed to generate an average audio energy function (for example an RMS [root mean square] voltage measuring circuit) such that when commercials are present, the circuit 116 assigns a higher value to the normally higher average audio signal levels that commercials produce in comparison to the program video (for example, a movie). The threshold detector 118 is set to trigger an output of for example a high logic level for the higher than average audio level signals from the determining circuit 116. The logic circuit 114 may consist of a central processing unit (CPU) which makes a decision based on a video fade to black signal (or a black field signal) and to a higher than normal audio signal level. Normally program video will fade to black followed by the higher than normal audio level, whereupon the logic circuit 114 will output a signal indicative of the presence of a commercial.

In certain situations, when the video signal decreases to a substantially black video level in the detector 112, the logic circuit 114 may look for a low in audio energy or for a loss of audio level to determine that a commercial is either about to begin or to end. For example, the video fades to black, which includes a short interval of audio silence, followed by a larger than normal audio volume, whereupon a commercial then begins.

It is to be understood that in some cases, the detector 112 may be a cut or switch to black detector.

Figure 13A:
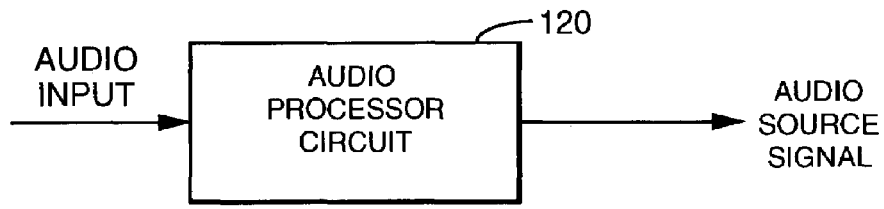
FIGS. 13A and 13B are block diagrams illustrating alternative embodiments of the invention which provide for reducing or defeating the effectiveness of a commercial skip system which employs an audio sensing technique to detect commercials.

FIG. 13A illustrates an alternative embodiment of the invention, which provides for reducing or defeating in real time a commercial skip system which detects commercials using an audio sensing system. To this end, an audio processor circuit 120 receives an audio signal and compresses or substantially evens out the differences in audio levels or average audio levels of both the video (program) signal and the commercials. As a result of such an averaging of the audio levels of both the video signal and commercials, the effectiveness of a commercial skip detection system that tracks, i.e., senses, the audio signal as well as the video signal will be reduced.

The audio processor circuit 120 may be a simple, or a more sophisticated, that is, multiband, audio processor, which may include an automatic gain control (AGC) circuit, an audio peak limiting circuit, or an audio level compressor circuit. Alternatively, the audio processor circuit may include an overcompensation circuit such that a large audio signal is not "evened out" or averaged, but is turned down lower than the desired average level. Such an overcompensation in gain reduction is achieved for example by increasing the DC gain following the rectifier circuit in an AGC amplifier.

Figure 13B:
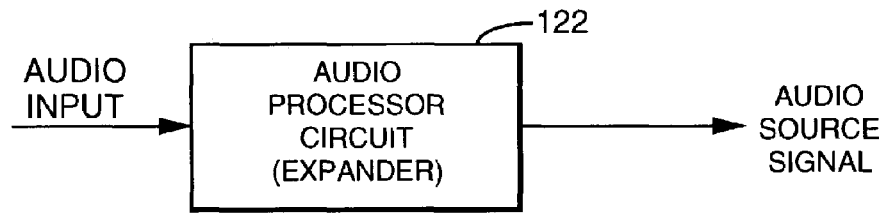

FIG. 13B illustrates another embodiment of the invention, for reducing or defeating a commercial skip system which employs an audio sensing system, wherein an audio processor circuit 122 expands and attenuates the higher than normal average audio signal levels of a commercial so as to match substantially the average level and/or the dynamic range of the program material's audio signal.

Figure 14A:
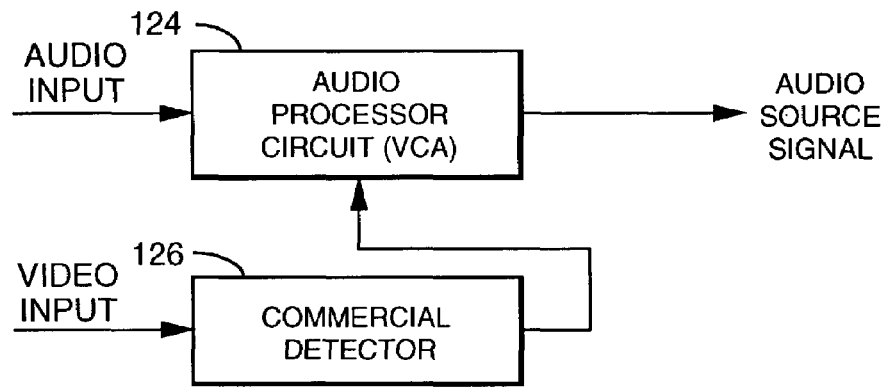
FIGS. 14A and 14B are block diagrams illustrating further embodiments for decreasing audio levels automatically via a video source so as to reduce or defeat the effectiveness of a commercial skip system which employs an audio sensing technique.

FIG. 14A illustrates still another embodiment of the invention in which the audio signal level is turned down automatically in real time via an audio processor circuit 124, for example, a voltage control amplifier, upon detection of a commercial via a commercial detector circuit 126. The circuit 124 may be set to a desired commercial audio level, including an attenuated commercial audio signal level. It follows that the audio processor circuit 124 generally reduces the audio signal level for commercials, while not substantially affecting the program material's audio signal levels. The circuit of FIG. 14A also may be used to reduce the effectiveness of a commercial skip system, such as a system which senses the audio signal track (e.g., the system of FIG. 12).

Figure 14B:
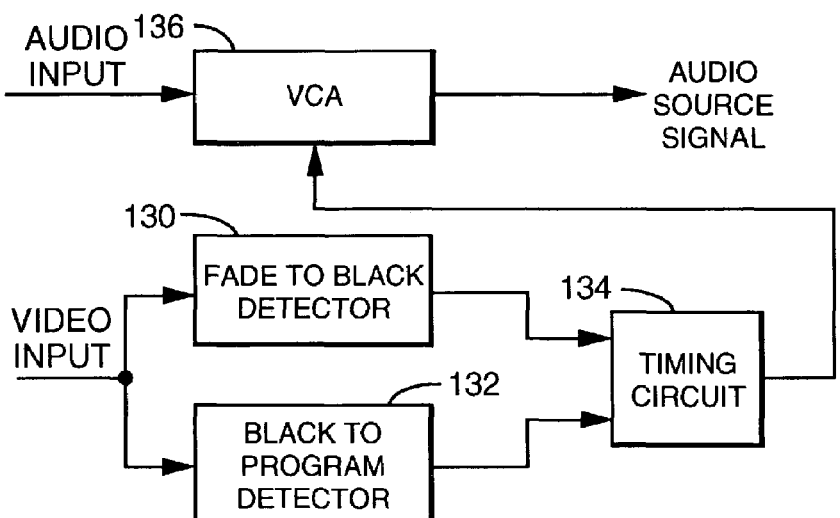

FIG. 14B illustrates in further detail the modification of an audio signal when a commercial is sensed, as shown in FIG. 14A for example. To this end, a video signal is supplied to a fade to black detector circuit 130 and/or a black to program detector circuit 132. The output of one or both circuits 130, 132 is supplied to a timing circuit 134 which generates an output signal which is coincident with the occurrence of commercials. The output of the circuit 134 is supplied to an audio signal voltage control amplifier 136, which in turn produces a modified (for example, lowered) audio signal level during the presence of a commercial. Ergo, the circuits of FIGS. 14A, 14B provide the same uses or purposes.

Figure 15:
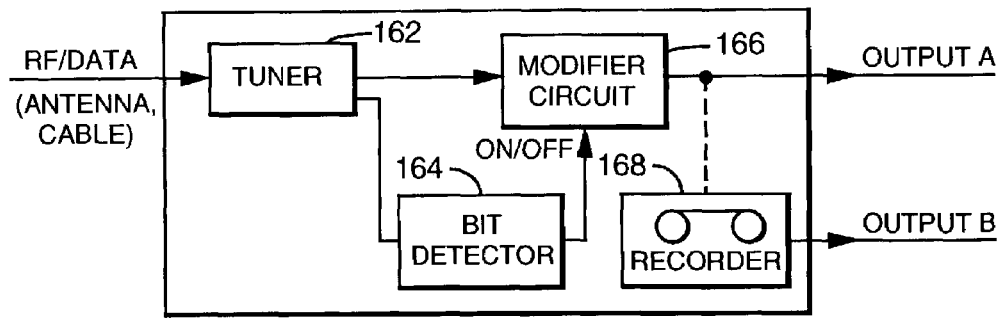
FIG. 15 is a block diagram illustrating another embodiment of the invention as incorporated in a user's set top box. An associated recorder may include magnetic tape hardware or optical disk technology such as for example DVDR, CDR, etc., devices, and/or may include a hard drive, a CD ROM, a tape transport, a DVD ROM, a DVD-R, CDR, CDRW or a memory unit such as RAM or ROM.

FIG. 15 illustrates another embodiment of the invention for reducing in real time the effectiveness of a commercial skip system, in which the circuit is incorporated in a set top box, which may also contain a recording apparatus. To this end, a tuner 162 receives an RF signal or data signal and supplies at its output a signal containing video information plus at least one control bit. The control bit is supplied to a control bit detector 164 which supplies a control signal to a signal modifier circuit 166, which also receives the output signal from the tuner 162. The modifier circuit 166 may incorporate any embodiment or combination of embodiments of previous mention which have the intention of reducing or defeating the effectiveness of a commercial skip system. It follows that the output of the modifier circuit 166 for example may contain selected portions of selected video lines with a level shifted signal (for example a non-black level signal, etc.) in response to the presence of the control bit.

The output of the modifier circuit 166 may be coupled to a recorder 168 containing a commercial skip system the effectiveness of which will be reduced or defeated in accordance with the invention. FIG. 15 also illustrates a system whereby a transmitting cable facility or a broadcast facility has the capability of controlling the commercial skip system associated with for example a consumer's VCR, PVR or other recording apparatus.

Figure 16:
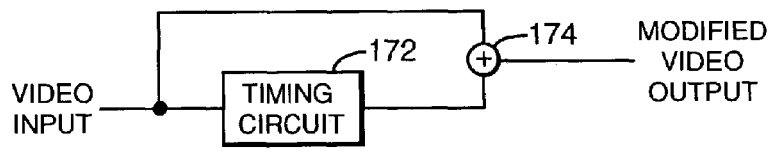
FIG. 16 is a block diagram illustrating an alternative embodiment of the invention which employs a modification of a portion of the horizontal blanking interval (HBI) (for example, the horizontal sync, H sync) to degrade or reduce the effectiveness of a commercial skip system which uses the H sync to detect the presence of a commercial.

FIG. 16 illustrates a circuit of another embodiment of the invention for reducing or defeating a commercial skip system which uses a sync signal to detect the presence of a commercial. Ergo, this embodiment implements modifications (including in real time) in a portion of the HBI, namely the normal H sync signal (176 of FIG. 16A) of selected video lines, as illustrated in FIGS. 16B and 16C, so as to mislead and otherwise degrade the performance of a commercial skip system. To this end, a video signal (FIG. 16A) is supplied to a timing circuit 172 which generates a signal, that is, pulses, which are coincident with a selected portion of the HBI such as for example the H sync signal 176. The pulses may be of positive or negative polarity to correspondingly modify the selected portion of the HBI in the selected video lines. The output of the timing circuit 172 is supplied to an adder (or inserter) 174 which has a second input coupled to the video signal. The resulting output signal on an output of the adder 174 then contains H sync signals of the input video signal with selected amplitude modified portions such as exemplified in FIGS. 16B, 16C.

Figure 16A:
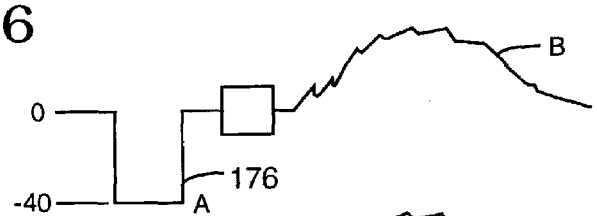
FIGS. 16A-16C are waveforms illustrating the modification of the HBI as performed by the circuit of FIG. 16.
Figure 16B:
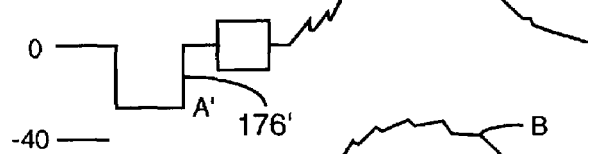
Figure 16C:
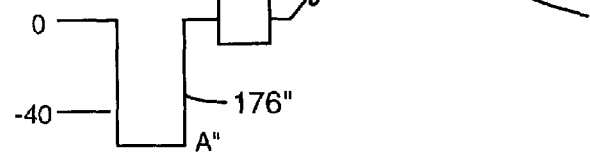

FIG. 16A illustrates a normal 1BI waveform wherein the H sync signal 176 is nominally 40 IRE units in amplitude. A commercial skip system may use a comparison of the nominal H sync signal with respect of the active video signal's picture level as a technique for assessing whether the video signal has faded to black level in a predetermined manner thereby depicting the start of a commercial. To exemplify, such a technique may determine the difference between the active video level and the H sync tip. When the video signal transitions to a commercial, a fade to black sequence begins and the signals B-A of FIG. 16A becomes about 40 IRE units. A commercial skip system may use this value to mark the beginning of a commercial.

Referring to FIG. 16B, if a portion of the H sync signal is modified, then a commercial skip system will measure a different value B-A'. For example, the H sync tip level has been reduced, and during dark scenes in the video signal, the difference B-A' is less than 40 IRE units in amplitude, or lower, and thereby may cause the commercial skip system to mis-mark the beginning of a commercial.

In FIG. 16C, a portion of the H sync signal is increased, whereby a fade to black signal in the video signal indicating a commercial will be greater than 40 IRE units. Thus the commercial skip system will not mark the beginning of a commercial.

Figure 17:
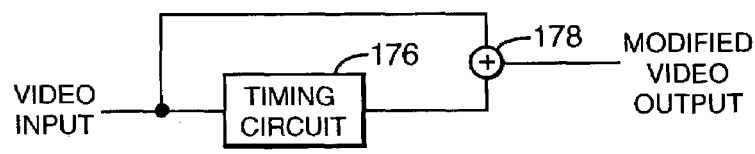
FIG. 17 is a block diagram illustrating another alternative embodiment of the invention which employs a modification of a portion of a back porch of the HBI to degrade the effectiveness of a commercial skip system which uses the back porch level to determine the presence of a commercial.

FIG. 17 illustrates a circuit of still another embodiment of the invention for reducing or defeating a commercial skip system (including in real time) which uses a back porch signal to detect the presence of a commercial. This embodiment thus modifies a portion of the back porch of an HBI of selected television lines so as to cause an erroneous reading of the commercial skip system. Here a video signal is input to a timing circuit 176 and the output comprises a signal coincident with a portion of the back porch in selected video lines of the video signal. The output of timing circuit 176 is coupled to an adder (or inserter) 178, which adds the output signal to the video input so as to modify the level of a portion of the back porch of selected lines of the video signal.

Figure 17A:
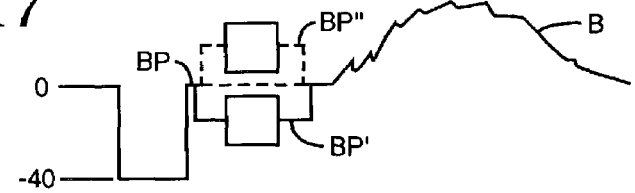
FIG. 17A is a waveform illustrating a modification of the HBI as performed by the circuit of FIG. 17.

Referring to FIG. 17A, a black reference level, zero (0), is altered since as previously mentioned a commercial skip system may use a portion of the back porch to compare with the active video portion. For instance, normally the back porch level is BP, and a fade to black before a commercial will yield B-BP, which is about 0 to 7.5% white. By altering a portion of the black porch such as lowering a portion of the back porch, as seen in BP', a fade to black before a commercial will yield B-BP', a number greater than 0 to 7.5% white (e.g., greater than 10 IRE units). As a result of the lowered back porch portion, the commercial skip system will not see a situation that denotes a fade to black.

Alternatively, a portion of the back porch level may be raised as depicted by dashed line and symbol BP''', to cause B-BP''' to yield 0 to 7.5% white level during a program. This condition will cause a commercial skip system to erroneously mark or identify non-commercial portions of the program video as the beginning of a commercial.

It should be noted that the modifications to a portion of sync or to a portion of a back porch can be implemented via insertion and/or variable gain means in place of the adder circuit, 78.

Figure 18:
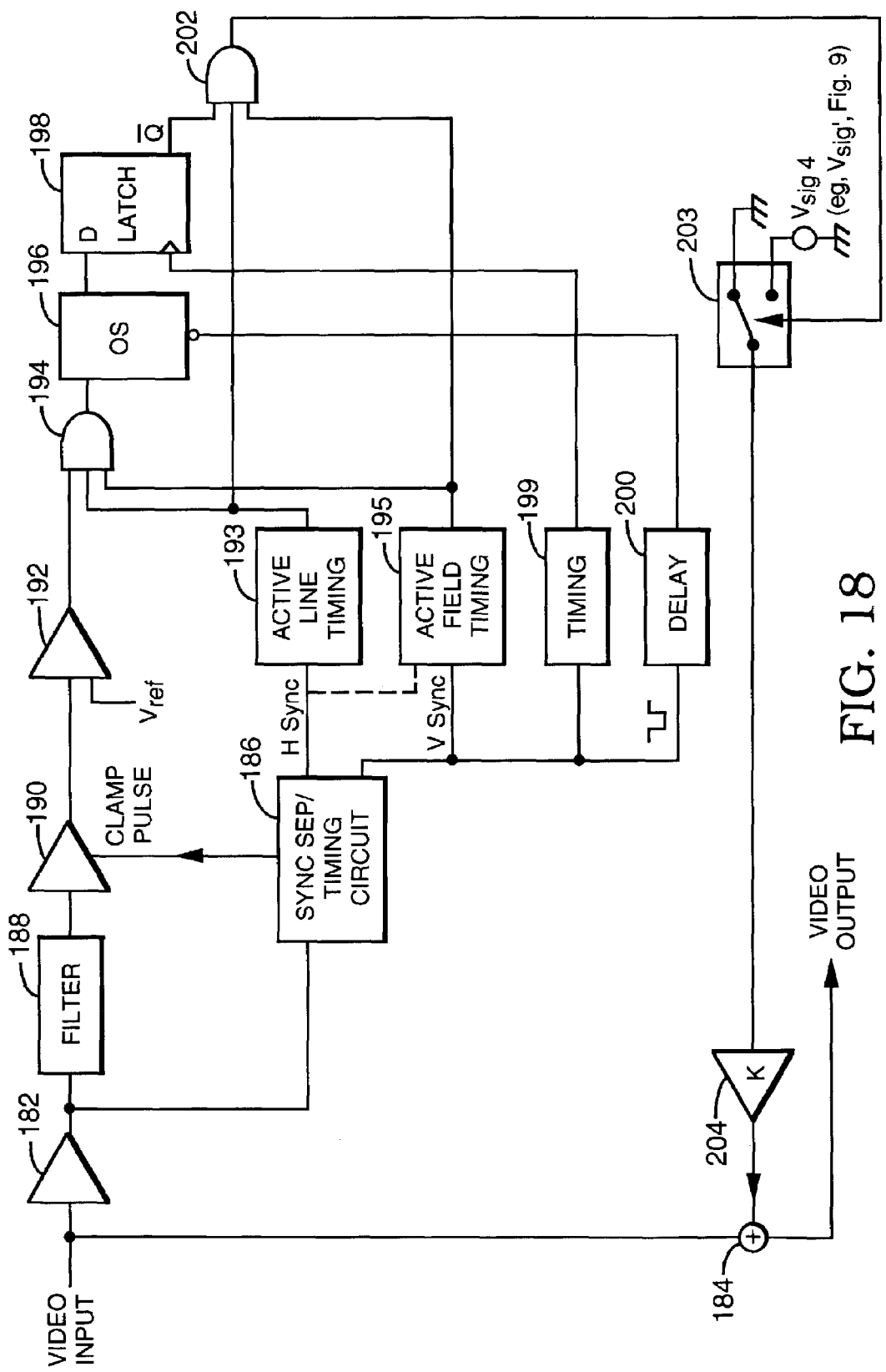
FIG. 18 is a block diagram illustrating still another embodiment of the invention which automatically adds a signal to the video signal during substantially black level video fields to thereby reduce the effectiveness of a commercial skip system.

FIG. 18 illustrates yet another embodiment of the invention wherein a signal (i.e., a modifying signal) is automatically added or inserted to the program video (for example, in real time) during substantially black level video fields to thereby reduce the effectiveness of a commercial skip system.

By way of explanation, when program video fades to black for an upcoming commercial, a number of black active video fields will occur. By sensing a video field that is below a predetermined level, for example, black level, the signal (i.e., a modifying signal) may be added to the next video field to disrupt the commercial skip system.

Accordingly, the technique employed by this embodiment senses the signal level of the video signal, i.e., program video, in real time throughout the active portion of the video signal. Any video signal level above a predetermined level is considered a non-black program video level, whereupon no modifying signal is added.

To this end, referring to FIG. 18, a video source supplying program video is coupled to an amplifier 182 and also to an input of a summing circuit 184. The output of amplifier 182 is coupled to a sync separator/timing circuit 186 and to a filter 188. Filter 188 is optional, but for example can be a luminance bandwidth filter or a full video bandwidth filter. A purpose for filter 188 is to reduce noise. The output of filter 188 is coupled to a clamp amplifier 190, which preferably clamps the program video to a reference level such as blanking level or a sync tip level. The output of clamp amplifier 190 then is coupled to a comparator 192. A reference voltage Vref is coupled to one of the inputs of comparator 192, wherein for example Vref may be set to correlate to above black level or about +10 to +15 percent of peak white. Vref may comprise a value slightly greater than a minimum luminance level, wherein the minimum luminance level may be derived by the filter and negative peak detector 152, FIG. 14. The output of comparator 192 then becomes for example logic high for any pixel that is above 10 or 15 percent peak white. An AND gate 194 assures that the logic high signal from comparator 192 correlates to a selected portion of the active field and/or active line, in response to video active line and video active field timing signals supplied to AND gate 194 by active line and active field timing circuits 193 and 195, respectively.

The output of AND gate 194 is coupled to a one shot or flip flop, 196, which generates a pulse extending to the VBI. This extended pulse is transferred to a latch 198 to indicate that a previous field had a non-black signal. Latch 198 is clocked by a timing circuit 199. After the logic pulse of flip flop 196 is transferred to the latch 198 every field, a reset pulse from a delay circuit 200 clears the output of flip flop or one shot 196.

An inverting output of the latch 198 is supplied to an AND gate 202 which also receives the timing signals from the active line and active field timing circuits 193, 195. The output signal from the AND gate 202 is supplied to a switch 203 and restricts the addition of a signal Vsig. 4, via the switch 203 during selected portions of active fields and/or active lines. The signal Vsig.4 is coupled to one input of the switch 203, the other input being ground.

In the case of a full field being a non-black signal, the output of the circuits of the comparator 192, AND gate 194 and flip flop 196 will be high in this example. But since the inverting output of the latch 198 is used, a logic low from AND gate 202 switches the switch 203 to the ground input. Thus a logic low (i.e., a zero level) is coupled to the video signal, i.e., program video, via the switch 203 and the ground input, since an attenuator amplifier 204 supplies a logic low to the summing circuit 184 of previous mention. The program video then is supplied from the summing circuit 184 via an output terminal.

However, if a full field is truly at black level, then the outputs of comparator 192, AND gate 194 and flip flop 196 will be low and the inverting output of the latch 198 will be high. Thus, a high logic level or signal is added in this example to the video signal via the switch 203, the signal Vsig.4 and the attenuator amplifier 204, during a selected portion of the next active field of the program video signal. To enhance the playability of the signal, it is preferable that Vsig.4 be an amplitude or position modulated signal such as a varying ramp signal which raises for example pixel or line levels as a function of time. The modulated signal may increase and decrease in level, that is, may have varying increasing rates. Of course it is readily apparent that a field store, such as for example the delay circuit 208 of FIG. 19, may be used to correctly time the added signal to the existing active field rather than to the next active field.

FIG. 19 illustrates a circuit which, in accordance with the invention, adds a modifying signal to a video signal (for example, in real time) that contains at least a video field of black level. Since black level fields are used by commercial skip systems to detect the presence of commercials, as previously described, adding a modifying signal to the black level fields will reduce the effectiveness of the commercial skip system.

To this end, in FIG. 19 an input video signal, i.e., program video, is supplied to a timing circuit 210 which then outputs a signal which is correlated to a portion of the active video signal. A black level field detector 212 receives the input video signal and senses any pixel of a value above black level during a selected portion of a video field determined by the timing circuit 210, and then outputs in real time a selected, i.e., low, logic level for the next video field. Should there be a portion of a field that has no pixel value above black level, the black level field detector 212 will then output an alternative, i.e., high, logic signal for the next video field. In this instance, the output of detector 212 is then combined with the video input signal via an inserting or summing circuit 214, which then outputs the modified black level fields in the video signal to confuse the commercial skip system. It is preferable to combine the "delayed" signal output from the detector 212 with a delayed input video signal. To this end, a delay circuit 208 is illustrated in dashed line and delays the input video signal before supplying it to the summing circuit 214.

FIG. 19A illustrates a waveform of a conventional input video signal supplied to the timing circuit 210 of FIG. 19. Three active video fields of program video 216, 216', 216", are shown preceding two black level fields 218 and 218'. As previously described, if there is a portion of a video field that has no pixel above black level, for example field 218, the black field detector 212 of FIG. 19 will output the alternative (high) logic signal 220 FIG. 19B for the next field 218'. The transition in FIG. 19A from the last field of program video 216" to the black level field 218 constitutes an example of a fade to black signal such as extensively discussed previously.

FIG. 19C illustrates an embodiment of the invention in which a modifying signal 222 is added to the (delayed) video signal that contains at least a field of black level; i.e., field 218, field 218', etc. The modifying signal 222 is shown superimposed on the black level fields 218, 218' and may comprise about a +15 IRE signal for example.

FIG. 20 is a block diagram illustrating the addition of a (first) modifying signal to black level fields (for example, in real time), wherein the signal may be about a +9 IRE signal. In addition to such a first signal, a second signal such as about an 8 IRE boost signal also may be added to portions of the active video signal. The boost signal of about 8 IRE is within the range of the brightness control of most television sets upon playback of the program video, and thus any increase in brightness in the viewed program video can be compensated.

To this end, a video signal is received by an automatic black level circuit 226 which also receives for example the first modifying signal as a signal Vsig4, equivalent to the Vsig4 of FIG. 18. The circuit 228 thus outputs a video signal in real time in which the black level fields include the first modifying signals. An additional signal adding circuit 228 receives the video signal with shifted black level fields and adds the about 8 IRE boost signals to the previously shifted black level fields as controlled by a Vsignal input 230.

It follows that the embodiment of FIG. 20 results in reduced visibility of the combined modifying (pedestal) and boost signals by a viewer because about an 8 IRE black level boost that has been readjusted in the television set plus about a 9 IRE pedestal in normally black level fields is barely perceptible to the viewer, while causing about a net 17 IRE shift in the black level as seen by the commercial skip system. The approximately 17 IRE shift in black level fields reduces the effectiveness of the commercial skip detector and thus system. Of course values or levels other than 9 and 8 IRE for the first modifying and boost signals, respectively, may be used.

FIG. 20A illustrates a conventional video signal supplied to the automatic black level circuit 226 of FIG. 20 and which depicts the signal with non-black (i.e., program video) field(s) 232 and black level field(s) 234.

FIG. 20B illustrates the video signal output from the automatic black level circuit 226, in which first modifying signal(s) Vsig.4 (of for example about 9 IRE) are added to the black level field(s) 234.

FIG. 20C illustrates a video signal output from the additional signal adding circuit 228 of FIG. 20, in which the additional boost signal 230 of previous mention in FIG. 20 is added to portions of the active video signal resulting in a raised level throughout the respective portion of the video signal. It follows that the original non-black signal 232 (i.e., program video) has been raised slightly and can be adjusted back to the normal black level by adjusting the brightness control of the television set upon playback. However, the original black level fields 234 still are raised to a higher level of the signals 230 plus Vsig.4.

More particularly, the dashed line 242 represents the television set's new black level after the brightness control has been adjusted (down slightly). The boost signal 230 added to the portions of the active video signal results in a slight increase in the level as depicted at 230+Vsig.4 with respect of the television set black level 242 depicted in dashed line. However, the commercial skip system has a black level reference denoted by the dashed line 244 and therefore senses a larger signal level shift for the black level fields. This causes an erroneous reading of a reference black level by the commercial skip system thereby reducing in real time the effectiveness of the commercial skip system.

In still other embodiments of the invention, other means for reducing or modifying the video signal in accordance with the invention for reducing the effectiveness of a commercial skip system, may include, first, a change in frequency response, and/or, second, a non linear transfer function of for example an amplifier, situated for example in a broadcast facility. See the circuit of FIG. 10 for example. These other means thus can be used to reduce the effectiveness of a commercial skip system and may be implemented in any combination of analog, digital, RF, or software technologies.

To illustrate, in the first means of employing a change in frequency response, a horizontal line tilt or vertical field rate tilt is created. This tilt or overshoot on a black level signal will cause a higher than normal signal, which can be used to reduce the effectiveness of a commercial system. The change in frequency response may be implemented in the modifier circuit 8 of FIG. 1B.

To illustrate further, an altered frequency response may be implemented via FIG. 10, with the elements 98, 100 and 106 of FIG. 10. Capacitor 98 is chosen to cause a lift in frequency response at a selected frequency, and preferably, another capacitor (not shown) connected in parallel to resistor 106, is used to shelve the lift at another frequency. Note that the signal from signal source 104, Vbias, is an AC ground. Implementing this frequency response alteration (when supplied to a commercial skip system), will cause tilt or overshoot in the video waveform supplied from the output of the switch 102 or the amplifier 108, which can reduce the effectiveness of a commercial skip system.

Such a frequency response alteration also may be implemented in the RF domain to achieve the results discussed in the previously mentioned paragraph.

Similarly, in the second means, which employs a non linear transfer function, a non linear amplifier included for example in the modifier circuit 8 of FIG. 1B may be used to reduce the effectiveness of a commercial skip system. In this embodiment, the transfer function (or gamma) of for example the amplifier is altered to likewise alter the commercial identifying signal supplied to a commercial skip system. An example of altering the transfer function would be to increase the gain for black or dark gray levels. As a result, black levels will be boosted to a new higher signal level, which generally will reduce the effectiveness of a commercial skip system.

FIGS. 21A, 21B and 21C illustrate examples of nonlinear transfer functions, which may be implemented in software and/or hardware. FIG. 21A is an example whereby the black levels are raised and thus this nonlinear transfer function may be used to restrict a minimum black level, which then may be used to reduce the effectiveness of a commercial skip system.

FIG. 21B illustrates another nonlinear transfer function, which also restricts a minimum black level of video signal. This transfer function may be implemented via black clipping, again via software and/or hardware. Because there is some black clipping, the effectiveness of a commercial skip system is reduced.

Alternatively, FIG. 21C illustrates a nonlinear transfer function that compresses or drops some of the black level. This transfer function may be used to at least counter a nonlinear transfer function such as denoted in FIG. 21A. FIG. 21C also may be used to lower the black levels of a video signal to thereby improve, rather than reduce, the reliability of a commercial skip system.

In an alternative embodiment of the invention, a substantially complementary frequency response curve (e.g. undershoot) or complementary non-linear amplifier (e.g. depressed black level) may be used to at least partially offset the tilt or boosted black levels of the two previously mentioned means, and thereby provide some restoration in effectiveness of a commercial skip system. The complementary effect described in the preceding paragraph also may be used to improve the reliability of a commercial skip system which has not been altered via any of the effectiveness reducing embodiments of the present invention such as those of FIGS. 1B, 2B, 2C, 3, 5, etc., as is further described below.

In regard to alternative embodiments of the invention for at least partially restoring the commercial skip system or at least restoring the capability of commercial detection, modified versions of for example FIGS. 3 and/or 5 may be used. To illustrate, in FIG. 3, either offset signal Vsig.1 may be inverted in polarity or amplifier 20 may be inverted in gain. Then, the output of amplifier 20 will add a negative signal to selected pixels of selected lines of selected fields of the video signal thereby to restore at least part of the commercial skip system's capability. The output 22 thus is a signal that at least partly restores the commercial skip system operation, whereby a signal such as the video signal on input 12 has been modified to reduce or defeat the commercial skip system which includes a commercial detector.

Similarly to the conversion of FIG. 3 to at least partially restore a commercial skip system, FIG. 5 may have signal Vsig.2 modified (for example a negative signal) to add or to replace a commercial skip system defeat signal for selected pixels of selected lines of selected video fields to at least partly restore the commercial skip system. Here, for example, the video signal on input 30 had been modified to add positive signal levels at selected time intervals to reduce or defeat the commercial skip system. By modifying signal Vsig.2 to a negative or inverted signal, the outputs 56 and/or 58 will have selected portions of the video signal lowered in level to thereby at least partly offset a portion of the added positive levels, to at least partly restore the commercial skip system to properly detect commercials.

Figure 22:
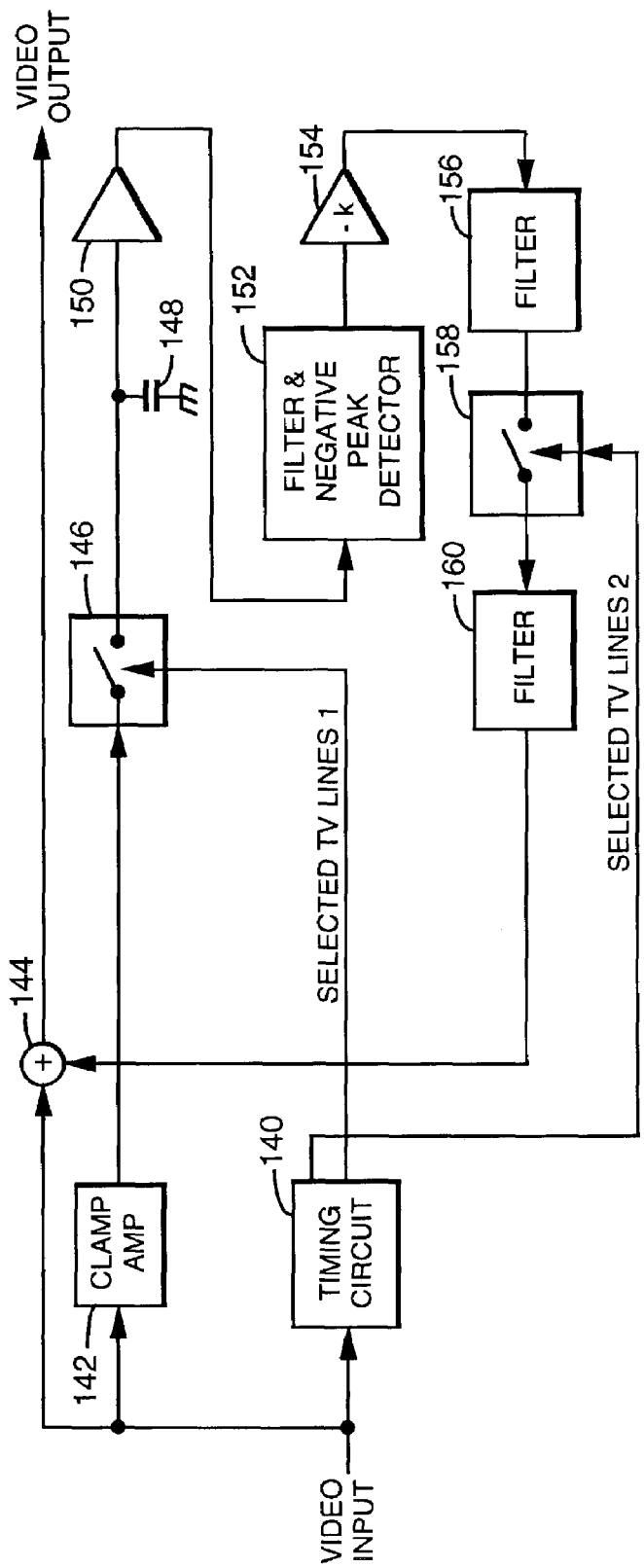
FIG. 22 is a block diagram illustrating an alternative embodiment of the invention for detecting a luminance level which has been level shifted and then returning the video signal to its normal condition, to thus at least partially restore or enhance the effectiveness of a commercial skip system.

FIG. 22 illustrates another alternative embodiment of the invention for at least partially restoring (including in real time) the effectiveness of a commercial skip system. This embodiment detects the minimum luminance signal level of a video signal that has been level shifted with a pedestal signal, and then modifies the video signal with a negative level shifting signal so as to restore the video signal with a normal black level. Thus, the circuit of FIG. 22 may be used to restore or at least partially restore the effectiveness of a commercial skip system, and also may be used to enhance the effectiveness of an existing commercial skip system.

Referring to FIG. 22, a video signal is supplied to a timing circuit 140, a clamp circuit 142 and an adder 144. The timing circuit 140 supplies a signal coincident with selected active video lines to a control input of a switch 146. The output of the clamp circuit is a clamped or DC restored signal and is supplied to the input of a track and hold circuit formed of the switch 146, a capacitor 148 and a buffer amplifier 150. The clamp circuit 142 preferably contains a luminance filter or a chroma reject filter. The output of the buffer amplifier 150 preferably comprises a continuous stream of luminance signal values in response to the timing circuit 140.

The output of the buffer amplifier 150 is supplied to a negative peak detector, or minimum video level detector 152, which determines the minimum luminance signal value, which then is supplied to an inverting amplifier 154. The output of the inverting amplifier 154 is supplied to an optional filter 156, such as a low pass filter, and thence to a switch 158. A timing signal coincident with active portions of selected video lines is supplied to the control input of the switch 158 which, in response, gates, through a negative voltage during the active portions. The output of the switch 158 is supplied to an optional filter 160 which in turn couples a negative level shifting signal to one input of the adder 144, which also receives the video signal. The output of the adder 144 is a combined signal in which the incoming video signal is altered to restore the normal black level in the video signal.

Although the embodiment of FIG. 22 is employed hereinabove to restore the effectiveness of a commercial skip system which has been confused or made unreliable by an embodiment of the invention of for example FIGS. 2B, 2C, 3, 4, 5, 6, 10, etc., the system of FIG. 22 can also be used to improve or enhance the effectiveness of an existing effective commercial skip system.

More particularly, in the process of transmitting a video signal, a frequency response distortion, or other types of distortion, may occur in the video signal between the point of transmission and the point of reception of the signal. At the reception location or facility the receiving apparatus generally will incorporate the distortions as a positive level shift. It follows that such a "transmission distortion" can cause an existing (usually effective) commercial skip system to be unreliable. A system such as, for example the system of FIG. 22 (or a system for lowering black levels) may be used to compensate for such distortions to at least restore the reliability of the existing commercial skip system, or to enhance the effectiveness or restore the normal black level, of a commercial skip system which has been defeated or degraded.

To this end, the system of FIG. 22, or a system for lowering black levels, can be incorporated for example in a dual deck recorder, wherein a user may wish to dub a second cassette from a previously recorded set of programs on a first cassette. There are products available which will incorporate a commercial skip system in the dual deck recorder, whereby the commercial skip system is incorporated into the dubbed copy. The system of FIG. 22 then can be used to enhance the effectiveness of the skip system. It is understood that the modification of signals via FIG. 22 can be effected in the RF, digital or analog domain.

The system of FIG. 22 (or a system for lowering black levels) also may be used in baseband video signals which are supplied to a recorder that incorporates the commercial skip system. If there are "transmission distortions" in the black level due to transmission or other signal processing errors (e.g., incorrectly set black level), then the FIG. 22 system can be used to help in restoring or otherwise enhancing the effectiveness of the existing commercial skip system.

Accordingly, another alternative embodiment of the present invention provides a technique for enhancing the effectiveness, that is, the reliability, of an existing commercial skip system. To this end, the various methods and apparatuses of previous description in respect of for example systems for lowering video signals or black levels, such as illustrated in FIGS. 1B, 3, 5, 6, 10, etc., can be applied as well to enhance the reliability of the existing commercial skip system in a manner similar to the descriptions of the substantially complementary frequency response curve technique, the complementary non-linear amplifier technique of lowering black levels or the embodiment of FIG. 22, of previous discussion.

Figure 23:
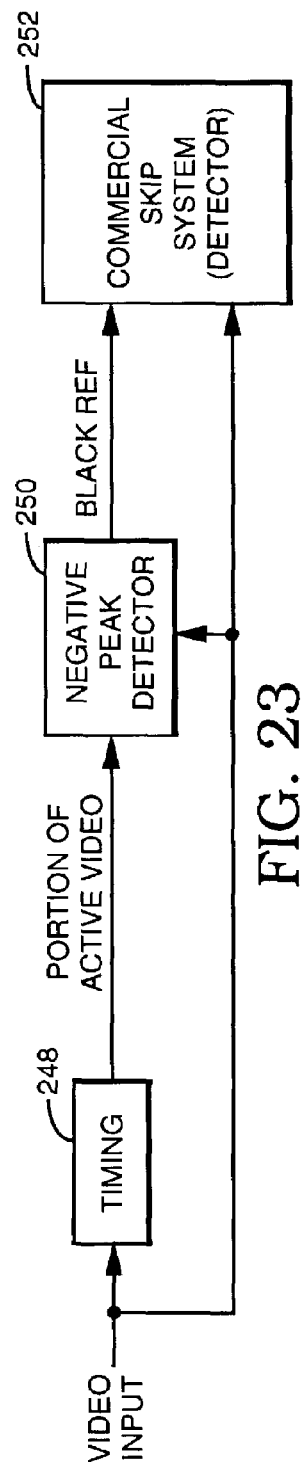
FIG. 23 is a block diagram illustrating an embodiment of the invention for enhancing the effectiveness of a commercial skip system or for at least partially restoring the effectiveness of a commercial skip system whose effectiveness has been reduced or defeated for example by an inventive embodiment of previous description hereinabove.

FIG. 23 illustrates an embodiment of the invention for at least partially restoring the effectiveness of a commercial skip system or for enhancing the effectiveness of a skip system. FIG. 23 illustrates a video signal coupled to a timing circuit 248 which outputs a signal representing a selected portion of the active video signal, such as the active line portions of the active video field. A negative peak detector, or minimum video level detector, 250 then measures and preferably stores the lowest signal level value of the video portion. For instance, if a video input signal has been modified with raised or increased black level(s), the negative peak or minimum level detector 250 will find the new black reference level. The commercial skip system will make use of this new black level reference from the detector 250 to detect for example a fade to black portion of the program video.

FIG. 23 thus illustrates a commercial skip system in which the effectiveness of the system is at least partially restored, wherein the lowest or black level of an active portion of the video signal is sensed and/or stored. A prior art commercial skip system normally takes 0 IRE or 7.5 IRE as a black reference level. Once the value of a true black level is measured, this value is fed to the commercial skip system to provide a more accurate method of sensing the commercial. When a video program's normal black level (e.g. 7.5 IRE in NTSC) has been modified or raised, for example by transmission or reception distortion, etc., to a new black level of about 15 IRE, the conventional commercial skip system may have degraded effectiveness. By sensing the new black level of for example 15 IRE via the negative peak or minimum level detector 250 and, timing circuit 248, and by using the new black level of, e.g., 15 IRE as a normal black level, the commercial skip system will have at least partly restored effectiveness in detecting and skipping commercials. Also, the commercial skip system (252) may have its active video pixel/line timing gate altered to restore or enhance the effectiveness of the commercial skip system.

Although the present invention has been described and illustrated in detail, it to be understood that the same is by way of illustration and example only and is not to be taken by way of limitation.

For example, the PVR or VCR may include a storage unit or units, which may include a hard drive, a CD ROM, a tape transport, a DVD ROM, a DVD-R, CDR, CDRW or memory unit such as RAM or ROM.

That is, it is also within the scope of the invention that digital and/or analog recorders may include a dual deck or multiple deck system, wherein such devices may be comprised for instance of a hard drive or memory, CDROM, DVD or tape for playback (e.g. playback devices), with hard drive, DVDR, CDR or tape or memory for recording (e.g. recording devices). Any of the playback devices mentioned above can comprise the program source 2 in FIGS. 1A and/or 1B. Likewise, any of the recording devices as described above can comprise the recorder 4 as denoted in FIGS. 1A and/or 1B. For instance, a recording of a program containing commercials may be played back so that a dub of the recording may contain skipped commercial(s). Modifying methods of previous description in accordance with the invention (e.g. raising a black level), may be used to reduce the effectiveness of skipping commercials in a dubbed copy of the recording. Likewise, methods of the alternative embodiments of the invention (e.g. reducing a black level) as described in the present application, may be used to enhance the effectiveness of skipping commercials in a dubbed copy.

Further, it is within the scope of the present invention that a set top box or computer receiving information such as for example via phone line, cable, satellite, Internet, DSL, or fiber communication, or the like, can be denoted in FIGS. 1A and/or 1B. In this instance, the set top box or computer may receive a-signal containing program information, which also may contain commercial information, for example as part of video on demand (VOD), pay per view (PPV) or pay per download (PPD) commands or the like. A commercial skip system may than be included in the set top box or computer via either software and/or hardware. It is readily apparent that any method, such as raising or lowering the effective black level, mentioned in this invention in the hardware and/or software domain, will modify the data related to the video information so as to reduce or to restore the effectiveness of a commercial skip system such as for instance, when program information is based on a VOD, PPV or PPD process.

It is apparent that the recorders containing the commercial skip system may be implemented by selected devices such as typically, set top boxes, PVRs, VCRs and/or multiple deck recorders. Also, the set top boxes may include tuner, recorder, hard drive, DVDR, etc., inside.

Likewise, it is apparent that a selected embodiment of the present invention is applicable for example when the reception of information (e.g., video data) is based on delivery systems such as phone lines, high speed connections, DSL, Internet, satellite, cable, fiber, wireless, WiFi, 802.11, USB, IEEE 1394, or the like.

In addition, a computer or computer component or software program may emulate a PVR or VCR for an equivalent purpose of recording programs with a commercial skip feature. The computer also may include a network or pocket computer. Further, the signal modifications and apparatuses or invention embodiments may be implemented in any combination of the analog, RF, software and/or digital domain.

Although the various embodiments of the invention have been described herein with reference to reducing or restoring the effectiveness of a commercial skip system, the invention concepts are equally applicable in similar technology concerning pre-recorded tapes, DVDs, video on demand, etc., where program video, movies, etc., are downloaded, etc. In this technology, the present invention may be used to reduce or restore the skipping of previews of coming movies, promotional material, movie trailers, messages, etc., as well as any commercials.

Thus, it is to be understood that the spirit and scope of the present invention is limited only by the terms of the appended claims and their equivalents.

The invention claimed is:

1. A method of processing a video signal to reduce or defeat the effectiveness of commercial skip systems incorporated in recorders, wherein the commercial skip systems detect a signal level in the video signal indicative of the beginning or end of a commercial, comprising:

modifying said video signal in real time to provide a modified video signal which eliminates or attenuates the indication of the beginning or end of a commercial, to thereby reduce or defeat the effectiveness of commercial skip systems.

2. The method of claim 1 wherein the step of modifying includes modifying selected pixels in selected video Lines of selected video fields of the video signal.

3. The method of claim 2 wherein the selected pixels in selected lines and fields are in some portion or portions of an overseen area of the video signal.

4. The method of claim 1 further comprising:
providing a selected signal of selected signal level; and
adding or inserting the selected signal to said signal level to eliminate or attenuate the indication of the beginning or end of the commercial.

5. The method of claim 4 wherein the selected signal has a selected signal level of about 5% to about 30% or more of white level.

6. The method of claim 4 wherein the selected signal is a video fade to non-black signal.

7. The method of claim 6 wherein the non-black signal may be a gray level signal, a station or network logo, a color signal, a gray level signal plus a color signal, a random or varying luminance signal with or without a random color signal, random color signal or a signal supplied via a non-linear transfer function.

8. The method of claim 6 wherein the non-black signal takes up selected pixels in selected video lines of selected video fields.

9. The method of claim 6 wherein the intensity of the non-black signal is varied as the video signal is fading to the non-black signal.

10. The method of claim 6 wherein the step of modifying comprises inserting a partial fade to black signal instead of a normal fade to black signal at the beginning of a commercial, whereby the partial fade to black signal defines a fade to non-black signal.

11. The method of claim 4 including:
generating a timing signal indicative of active line portions of selected video lines of the video signal; and
wherein the step of modifying is performed in response to the generated timing signal.

12. The method of claim 11 wherein:
said active video line portions are located in an overscan area of the video signal; and
a fade to non-black signal is inserted in the overscan area.

13. The method of claim 12 wherein the overscan area may be a few top and/or bottom video lines of an active video field or the beginning and/or end of selected video lines outside the active video line portions and generally in a horizontal blanking interval.

14. The method of claim 1 wherein said signal level used by the commercial skip system to detect and mark the commercial is a back porch reference, wherein the step of modifying comprises:
decreasing the level of at least a portion of the back porch reference so as to provide an erroneous back porch reference level which eliminates or attenuates the presence of a commercial sensed by a detector in the commercial skip system.

15. The method of claim 1 wherein said signal level used by the commercial skip system to detect and mark the commercial is a back porch reference, wherein the step of modifying comprises:
increasing the level of at least a portion of the back porch reference so as to provide an erroneous back porch reference level detection, which reduces the reliability of detecting the commercial by the commercial skip system.

16. The method of claim 1 wherein said signal level used by the commercial skip system to detect and mark the commercial is a sync tip reference, wherein the step of modifying comprises:
increasing at least a portion of the sync tip level so as to provide an erroneous sync tip level which eliminates or attenuates the presence of a commercial to a detector in the commercial skip system.

17. The method of claim 1 wherein said signal level used by the commercial skip system to detect and mark the commercial is a sync tip reference, wherein the step of modifying comprises:
decreasing at least a portion of the sync tip level so as to provide an erroneous sync tip level detection, and thereby reduce the reliability of detecting the commercial by the commercial skip system.

18. The method of claim 1 wherein said signal level in the video signal is a fade to black signal, the method comprising:
providing a video fade to non-black signal; and
wherein the step of modifying comprises inserting the fade to non-black signal in the video signal instead of the fade to black signal so as to eliminate or attenuate the indication of the commercial.

19. The method of claim 1 wherein the indication of the presence of a commercial comprises a series of active video fields of a level below a predetermined level, the method comprising:
detecting an active video field whose level is below the predetermined level;
providing a modifying signal of at least a selected voltage level; and
adding the modifying signal to the same active video field in real time or to the next active video field of the video signal during or after the detected active video field, respectively, to thereby reduce or defeat the effectiveness of the commercial skip system.

20. The method of claim 19 including:
correlating the steps of detecting and adding with a selected portion of the active video fields and/or active video lines in response to video active line and active field timing signals.

21. The method of claim 19 wherein:
the predetermined level of the series of active video fields is black level;
the modifying signal is a reference level above black level; and
the reference level is added to the same or the next active black level field during or after the detected active black level field.

22. The method of claim 1 wherein said signal level is a normal black level field, the step of modifying comprises:
adding a first modifying signal to the normal black level fields to shift the level of the fields; and
adding a boost modifying signal to selected portions of the modified black level fields to further shift the respective portions of the normal black level fields, to thereby reduce the effectiveness of the commercial skip system.

23. The method of claim 22 wherein the selected level of the first modifying signal is about 8 IRE and of the boost modifying signal level is about 9 IRE.

24. The method of claim 1 wherein the recorders containing the commercial skip system are implemented by selected devices such as typically, set top boxes, PVRs, VCRs, computers and/or multiple deck recorders.

25. A method of processing a video signal to reduce or defeat the effectiveness of commercial skip systems incorporated in recorders, wherein the commercial skip systems detect a signal level in the video signal indicative of the beginning or end of a commercial, comprising:
providing said signal level in the form of a fade to black signal; and
modifying said video signal by inserting in real time false fade to black signals from time to time in the video signal so as to simulate fading from the video signal to a black level indicative of the beginning of a commercial, thereby causing portions of the video signal to be skipped on playback to discourage use of the commercial skip system.

26. A method of processing a video signal to reduce or defeat the effectiveness of commercial skip systems incorporated in recorders, wherein the commercial skip systems detect a signal level in active video lines of the video signal, which signal level is indicative of the beginning or end of a commercial, comprising:
providing a selected signal of selected signal level; and
modifying said signal level in real time with the selected signal in selected active video lines to provide a video signal which eliminates or attenuates said indication of the commercial, to thereby provide the reduction or defeat of the effectiveness of the commercial skip system.

27. The method of claim 26 wherein said signal level is a fade to black signal, wherein:
the selected signal is a flat field of selected raised signal level; and
the step of modifying includes adding the flat field of selected raised signal level to the fade to black signal in the selected active video lines to raise the level of the video signal such that the fade to black signal indicative of the commercial does not occur reliably.

28. The method of claim 26 wherein said signal level is a fade to black signal, wherein:
the selected signal is a fade to non-black signal; and
the step of modifying includes modifying the fade to black signal with the fade to non-black signal in the selected active video lines such that the fade to black signal indicative of the commercial does not occur reliably.

29. The method of claim 28 wherein the fade to non-black signal is added to the fade to black signal to provide in effect a gray level signal.

30. The method of claim 28 wherein the fade to black signal is replaced with the fade to non-black signal so as to provide in effect a gray level signal.

31. The method of claim 28 wherein the fade to non-black signal takes up selected pixels of selected video lines of selected fields.

32. The method of claim 28 wherein the non-black signal may be a gray level signal, a station or network logo, a color signal, a gray level signal plus a color signal, a random or varying luminance signal with or without a random color signal, a random color signal or a signal generated via a non-linear transfer function.

33. The method of claim 28 wherein the step of modifying comprises inserting a partial fade to black signal instead of a normal fade to black signal at the beginning of a commercial, whereby the partial fade to black signal defines the fade to non-black signal.

34. The method of claim 26 wherein:
said active video lines contain active video line portions located in an overscan area of the video signal;
the selected signal is a fade to non-black signal; and
the fade to non-black signal is inserted in the overscan area.

35. The method of claim 34 wherein the overscan area may be a few top and/or bottom video lines of an active video field or the beginning and/or end of selected video lines outside the active video line portions and generally in a horizontal blanking interval.

36. A method of processing a video signal to reduce or defeat the effectiveness of commercial skip systems installed in recorders, wherein the commercial skip systems use a comparison of a normal signal level in. a selected portion of a horizontal blanking interval (IIBI) of the video signal with respect of the active video signal to provide a difference signal indicative of the presence of a commercial, comprising:
generating a timing signal coincident with the selected portion of the HBI; and
modifying said signal level in the selected portion in response to the timing signal so as to provide a second difference signal which fails to reliably indicate the presence of a commercial.

37. The method of claim 36 wherein the selected portion of the HBI is the horizontal sync (H sync) signal, and the step of modifying comprises:
decreasing or increasing the H sync signal to a selected amplitude so that a second comparison of the thusly modified H sync signal with respect of the active video signal provides a difference value which fails to reliably indicate the commercial, thereby reducing or defeating the effectiveness of the commercial skip system.

38. The method of claim 36 wherein the selected portion of the HBI is the back porch signal, and the step of modifying comprises:
decreasing or increasing the level of the back porch signal to a selected amplitude so that a second comparison of the thusly modified back porch signal with respect of the active video signal provides a difference value which is unreliably indicative of the commercial presence, thereby reducing or defeating the effectiveness of the commercial skip system.

39. Apparatus for processing a video signal to reduce or defeat the effectiveness of a commercial skip systems incorporated in recorders, wherein the commercial skip systems detect a signal level in the video signal indicative of the beginning or end of a commercial,comprising:
timing means receiving the video signal for providing timing signals indicative of selected active video lines, portions of lines and/or active video fields in the video signal; and
modifier means receiving the video signal for modifying said signal level in real time in response to the timing signals, to provide a modified video signal which eliminates or attenuates the indication of the beginning or end of a commercial, to thereby reduce or defeat the effectiveness of the commercial skip system.

40. The apparatus of claim 39 comprising:
a source of a selected modifying signal; and
wherein the modifier means comprises a video switcher or mixer circuit receiving the video signal and responsive to the selected modifying signal and the timing signals for providing the modifications to said signal level.

41. The apparatus of claim 40 wherein the selected modifying signal is a non-black level signal or a partial fade to black signal.

42. The apparatus of claim 39 wherein:
the selected modifying signal includes a first modifying signal of selected level and a boost modifying signal of selected level; and
the modifier means applies the first modifying signal to a black level field and the boost modifying signal to selected portions of the shifted black level field to further shift the field.

43. The apparatus of claim 39 wherein the modifier means comprises:
a source of a selected modifying voltage;
switch means responsive to the timing signals indicative of the selected active video lines or fields for supplying the selected modifying voltage; and
a summing circuit receiving the video signal for adding the selected modifying voltage to the video signal during the selected active video lines or fields.

44. The apparatus of claim 43 wherein the timing signals are indicative of portions of the selected active video lines and wherein the active video line portions are located in an overscan area of the video signal.

45. The apparatus of claim 39 wherein:
said signal level is a fade to black signal indicative of a commercial; and
the modifier means includes a partial fade to black or a fade to non-black level signal which the modifier means applies to modify the fade to black signal.

46. The apparatus of claim 39 wherein said signal level is a normal black level field, the apparatus comprising:
means for detecting an active video field whose level is not greater than the normal black level field;
wherein the modifier means includes a first black level circuit for applying a first modifying signal to the same or the next active black level field during or after the detected active black level field; and
an additional black level circuit for applying a second modifying signal to selected portions of the modified active black level field, to thereby reduce or defeat the effectiveness of the commercial skip system.

47. The apparatus of claim 39 wherein the modifier means comprises:
means receiving the input video signal for supplying a clamped video signal;
a partial AC coupled circuit receiving the clamped video signal for causing the input video signal to have a partial loss of DC restoration; and
switch means for inserting the partial AC coupled signal in place of the input video signal for selected lines andlor pixels in response to the timing means, whereby said signal level fails to indicate the presence of the commercial.

48. A method of processing an audio signal of a respective video signal to reduce or defeat the effectiveness of commercial skip systems installed in recorders, wherein the commercial skip systems detect a higher than normal average audio signal level indicative of the beginning or end of a commercial, comprising:
averaging the audio signal levels of both the video signal and the commercial; and
modifying the average audio signal level in place of the higher than normal average audio signal level to reduce the presence of said higher than normal average audio signal level, thereby reducing or defeating the effectiveness of the commercial skip system.

49. The method of claim 48 wherein the higher than normal average audio signal level is turned down so as to eliminate or attenuate the indication of said higher than normal average audio signal level and thus the indication of the commercial.

50. The method of claim 49 wherein the higher than normal average audio signal level is turned down via an automatic gain control circuit, an audio peak limiting circuit or an audio level compressor circuit.

51. The method of claim 48 wherein the higher than normal average audio signal level is expanded and attenuated so as to substantially match the average level and/or the dynamic range of the audio signal, to thereby reduce or remove the indication of the presence of the commercial.

52. A method of processing a video signal in real time to reduce or defeat the effectiveness of commercial skip systems incorporated in recorders, wherein the commercial skip systems detect an existing signal level in the video signal indicative of the presence of a commercial therein, comprising:
applying selected portions of the video signal to a non-linear transfer function to alter said signal level so that the commercial skip system fails to reliably detect the presence of a commercial.

53. The method of claim 52 wherein the existing signal level is a fade to black signal, and altering the transfer function increases the gain of the black level to raise the black level to a higher signal level, thereby reducing the effectiveness of the commercial skip system.

54. A method of processing a video signal to reduce or defeat the effectiveness of commercial skip systems incorporated in recorders, wherein the commercial skip systems detect a signal level in the video signal indicative of the beginning or end of a commercial, comprising:
modifying said video signal by adding in real time a selected signal to an active video portion of the video signal to correspondingly raise the level of the video signal to reduce the effectiveness of the commercial skip system.

55. A method of processing a video signal to reduce or defeat the effectiveness of commercial skip systems incorporated in recorders, wherein the commercial skip systems detect a signal level in the video signal indicative of the beginning or end of a commercial, comprising:
normally clamping selected active video portions of said video signal; and
modifying said normally clamped selected active video portions of the video signal in real time by at least partially AC coupling, or partially DC restoring, the video signal to reduce the effectiveness of the commercial skip system.

56. A method of processing a video signal to reduce or defeat the effectiveness of commercial skip systems incorporated in recorders, wherein the commercial skip systems detect a signal level in the video signal indicative of the beginning or end of a commercial, comprising:
detecting a selected minimum video signal threshold; and
adding a selected signal to the video signal in real time in response to the detection of the selected minimum video signal threshold, to reduce the effectiveness of the commercial skip system.

57. The method of claim 56 wherein the effects of changing luminance levels caused by adding said selected signal are minimized, comprising:
further adding an additional selected signal to selected portions of active video of the video signal.

58. A method of modifying a video signal to reduce or defeat the effectiveness of commercial skip systems incorporated in recorders, wherein the commercial skip systems detect a signal level in the video signal indicative of the beginning or end of a commercial, comprising:
  normally clamping the video signal;
  supplying a selected clipping level signal; and
  applying the clamped video signal to a negative peak clipping circuit responsive to the selected clipping level signal, whereby the level of the video signal is raised by the amount of the clipping level to thereby reduce the effectiveness of the commercial skip system.

59. A method of at least partially restoring or of enhancing the effectiveness of a commercial skip system incorporated in video recorders, wherein the commercial skip system effectiveness has been reduced or defeated by a system which partially or totally disables the commercial skip system by modifying an existing signal level indicative of a commercial, or by a system which provides less than an ideal transmission or delivery of the video signal to an existing commercial skip system, the method comprising:
  detecting the modified signal level which reduces or defeats the existing signal level used by the commercial skip system, or the less than ideal transmission or delivery of the video signal to the existing commercial skip system, which cause the skipping of commercials; and
  modifying the detected previously modified signal level to partially or totally restore the presence of the original existing signal level to similarly restore the effectiveness of the commercial skip system.

60. The method of claim 59 wherein the existing signal level has been reduced or defeated by increasing the video signal pedestal or offset, the method comprising:
  adding a negative signal of about −5% to about −30% of white level to selected portions of active video lines of the video signal to partially or totally restore the effectiveness of the commercial skip system.

61. The method of claim 59 wherein the existing signal level has been modified by inserting or adding a fade to non-black signal for the normal fade to black signal, the method comprising:
  replacing or attenuating at least a sufficient portion of the fade to non-black signal to cause at least a partial restoration of the commercial skip system.

62. The method of claim 59 wherein the transmission or delivery of the video signal to the existing commercial skip system is less than ideal thereby compromising the reliability or effectiveness of the existing commercial skip system, wherein the step of modifying comprises:
  applying selected portions of the video signal to a non-linear transfer function so as to cause an increase in the level of the selected portions to thereby enhance the reliability of the existing commercial skip system.

63. The method of claim 59 wherein the existing signal level is a normal black level, wherein:
  the step of detecting including detecting a minimum luminance signal level of the modified signal level of the video signal; and
  the step of modifying includes modifying the previously modified signal level with a negative level shifting signal which alters the video signal so as to restore the normal black level.

64. The method of claim 59 comprising:
  providing a timing signal indicative of a selected portion of the active video signal;
  determining a lowest signal level of the selected portion to correspondingly determine a new black level reference; and
  applying the new black level reference as a normal black level to thereby at least partially restore the effectiveness of the commercial skip system.

65. A method of partially or fully restoring the effectiveness of commercial skip systems incorporated in recorders, wherein said effectiveness has been reduced or defeated by techniques which alter or otherwise mask in a respective video signal an existing signal level which is indicative of a commercial, whereby the techniques cause the reduction or defeat of the commercial skip systems, the method comprising:
  providing the video signal with the altered version of the existing signal level, which altered signal level eliminates or attenuates the indication of a commercial; and
  modifying the altered signal level so as to at least partially restore in the original existing signal level which is indicative of a commercial to thereby at least partially or fully restore the effectiveness of the commercial skip system.

66. The method of claim 65 wherein the altered signal level is a video fade to non-black signal.

67. The method of claim 65 wherein the altered signal level is a flat field of about 5% to about 30% or more of white level.

68. The method of claim 65 wherein the altering in the altered signal level is performed in said real time in selected pixels in selected video lines of selected video fields of the video signal.

69. The method of claim 65 wherein the altered signal level is found in an active line portion or portions located in an overscan area of the video signal.

70. The method of claim 65 wherein the altered signal level comprises false fade to black signals inserted from time to time in the video signal to thereby falsely indicate a commercial which causes portions of the video signal to be skipped erroneously.

71. Apparatus for at least partially restoring the effectiveness of commercial skip systems incorporated in video recorders wherein the effectiveness of the commercial skip systems has been reduced or degraded by modifying an existing signal level in the video signal which is indicative of a commercial, or for enhancing the effectiveness of existing commercial skip systems in which the normal effectiveness has not been reduced or degraded, comprising:
  a timing circuit receiving the video signal for providing a timing signal indicative of selected active video lines;
  means for supplying a DC restored video signal;
  circuit means including detector means for determining a minimum luminance signal value of the DC restored video signal; and
  summing means coupled to the circuit means and responsive to the timing circuit for adding to the video signal a negative level shifting voltage corresponding to the minimum luminance signal value, to alter the video signal so as to at least partially restore the degraded commercial skip system or to enhance the effectiveness of the existing commercial skip system.

72. Apparatus for at least partially restoring the effectiveness of commercial skip systems incorporated in video recorders wherein the effectiveness of the commercial skip systems has been reduced or degraded by modifying an existing signal level in the video signal which is indicative of a commercial, or for enhancing the effectiveness of an existing commercial skip system in which the normal effectiveness has not been reduced or degraded, comprising:

a timing circuit receiving the video signal for providing a timing signal indicative of a selected portion of an active video field;

detection means responsive to the timing circuit for measuring and storing a lowest signal level value of the video portion to correspondingly determine a new black level reference; and means for applying the new black level reference as a normal black level to thereby at least partially restore or enhance the effectiveness of the degraded or of the existing commercial skip system.

* * * * *